(12) United States Patent
Masubuchi et al.

(10) Patent No.: US 12,304,992 B2
(45) Date of Patent: May 20, 2025

(54) CURABLE COMPOSITION AND SYNTHETIC LEATHER

(71) Applicant: ASAHI KASEI KABUSHIKI KAISHA, Tokyo (JP)

(72) Inventors: Tetsuo Masubuchi, Tokyo (JP); Eriko Hoshino, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 284 days.

(21) Appl. No.: 17/639,064

(22) PCT Filed: Sep. 4, 2020

(86) PCT No.: PCT/JP2020/033614
§ 371 (c)(1),
(2) Date: Feb. 28, 2022

(87) PCT Pub. No.: WO2021/045196
PCT Pub. Date: Mar. 11, 2021

(65) Prior Publication Data
US 2022/0332883 A1    Oct. 20, 2022

(30) Foreign Application Priority Data

Sep. 4, 2019  (JP) .................................. 2019-161308

(51) Int. Cl.
*C08G 18/44* (2006.01)
*C08G 18/80* (2006.01)
(Continued)

(52) U.S. Cl.
CPC ......... *C08G 18/44* (2013.01); *C08G 18/8016* (2013.01); *D06N 3/121* (2013.01); *D06N 3/147* (2013.01)

(58) Field of Classification Search
CPC ....................................................... C08G 18/44
See application file for complete search history.

(56) References Cited

U.S. PATENT DOCUMENTS 4,996,283 A * 2/1991 Greco .................... C09J 175/06
528/80
2003/0013792 A1 1/2003 Muhlfeld et al.
(Continued)

FOREIGN PATENT DOCUMENTS

CN        101153192 A        4/2008
CN        104822724 A        8/2015
(Continued)

OTHER PUBLICATIONS

International Search Report issued in International Patent Application No. PCT/JP2020/033614, dated Nov. 17, 2020, along with an English translation thereof.

*Primary Examiner* — Michael L Leonard
(74) *Attorney, Agent, or Firm* — GREENBLUM & BERNSTEIN, P.L.C.

(57) ABSTRACT

A curable composition including:
 a component (a): a polycarbonate polyol having a hydroxyl value of 40 to 75 mgKOH/g;
 a component (b): a polycarbonate polyol having a hydroxyl value of 100 to 280 mgKOH/g; and
 a component (c): a polyisocyanate having an average number of functional groups per molecule, of 2 to 6.

7 Claims, 2 Drawing Sheets

(51) Int. Cl.
  *D06N 3/12* (2006.01)
  *D06N 3/14* (2006.01)

(56) References Cited

U.S. PATENT DOCUMENTS

| | | |
|---|---|---|
| 2008/0090956 A1 | 4/2008 | Munzmay et al. |
| 2010/0261852 A1 | 10/2010 | Masubuchi et al. |
| 2011/0112245 A1* | 5/2011 | Nakamura ............. C08G 18/12 |
| | | 524/591 |
| 2011/0136976 A1 | 6/2011 | Nakamura et al. |
| 2011/0313100 A1 | 12/2011 | Morikami et al. |
| 2011/0313101 A1 | 12/2011 | Morikami et al. |
| 2015/0247043 A1 | 9/2015 | Berger et al. |
| 2021/0163738 A1 | 6/2021 | Higuchi et al. |

FOREIGN PATENT DOCUMENTS

| | | |
|---|---|---|
| CN | 107075069 A | 8/2017 |
| EP | 3611211 | 2/2020 |
| JP | 3142102 | 3/2001 |
| JP | 2003-119314 | 4/2003 |
| JP | 2004-346094 | 12/2004 |
| JP | 4177318 | 11/2008 |
| JP | 2009-185260 | 8/2009 |
| JP | 2013-108196 | 6/2013 |
| JP | 2013-151666 | 8/2013 |
| JP | 2014-105250 | 6/2014 |
| JP | 2014-185320 A | 10/2014 |
| JP | 2014-196430 | 10/2014 |
| JP | 2016-008234 | 1/2016 |
| JP | 2016-121211 | 7/2016 |
| JP | 2018-104486 | 7/2018 |
| WO | 2009/063767 A1 | 5/2009 |
| WO | 2010/098316 | 9/2010 |
| WO | 2010/098317 | 9/2010 |
| WO | 2012/010527 A2 | 1/2012 |
| WO | 2018/190280 | 10/2018 |
| WO | 2019/093219 | 5/2019 |

* cited by examiner

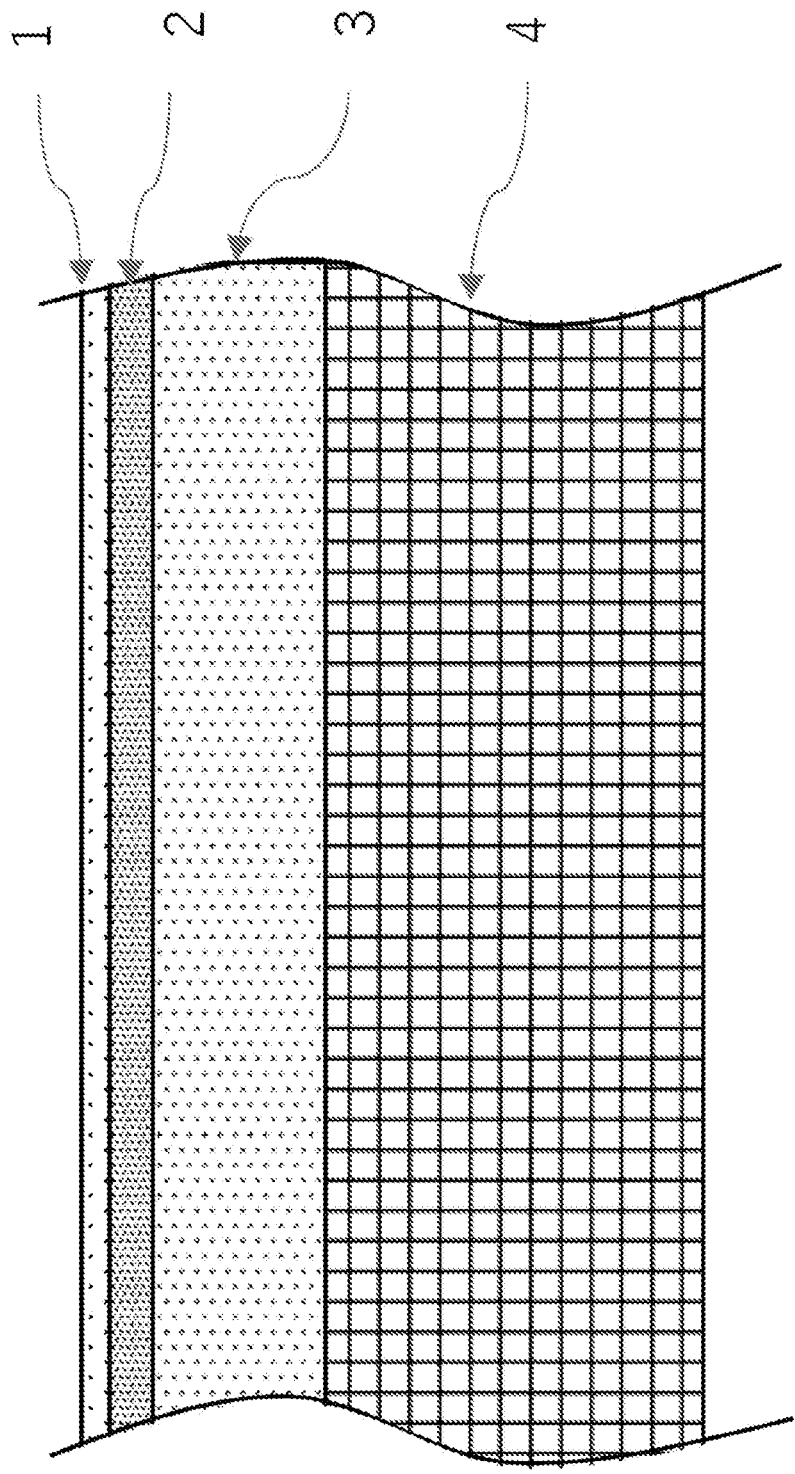
[Figure 1]

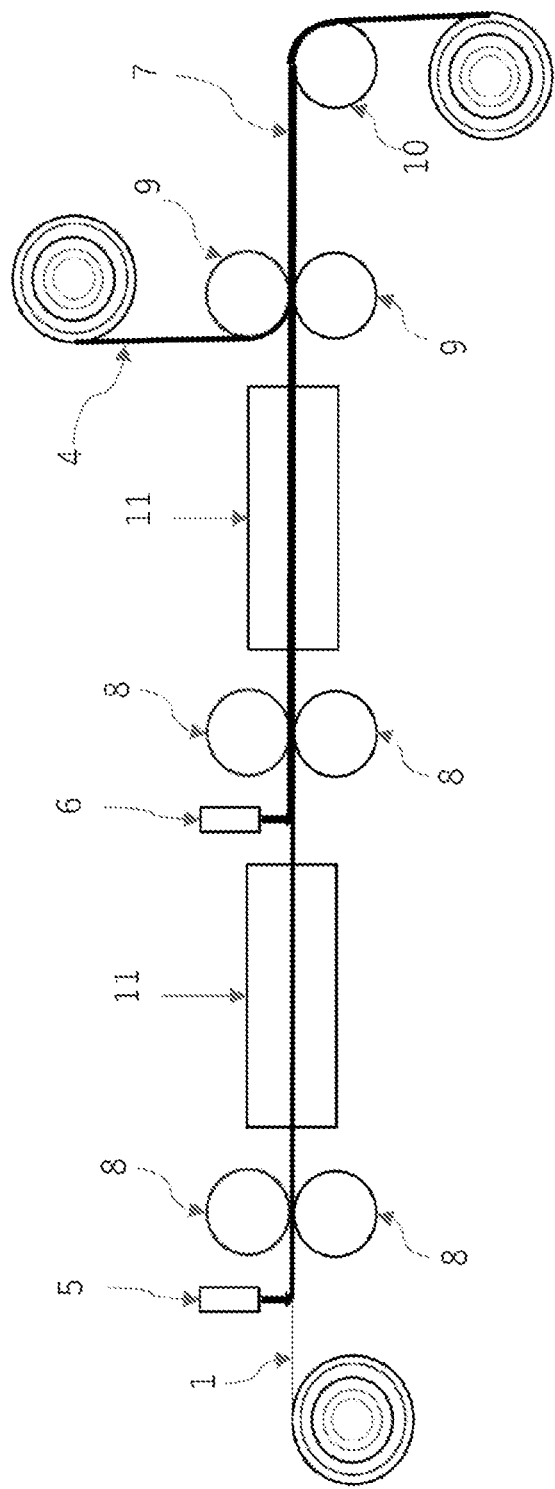
[Figure 2]

CURABLE COMPOSITION AND SYNTHETIC LEATHER

TECHNICAL FIELD

The present invention relates to a curable composition and synthetic leather.

BACKGROUND ART

Conventional synthetic leather has been obtained by coating a fibrous base material or a film-forming plate with a solution of a polyurethane resin obtained by polymerization with polyether polyol such as polypropylene glycol or polytetramethylene glycol, and coagulating the solution in water. Although having excellent flexibility, such synthetic leather is easily decomposed due to a component such as sweat and is problematic in terms of durability. There is also synthetic leather obtained by coagulating a solution of a polyurethane resin obtained by polymerization with polyester polyol obtained by reacting a hydroxy compound and a dibasic acid. This synthetic leather is problematic in terms of hydrolysis resistance.

For example, Patent Literature 1 discloses synthetic leather obtained from a polyurethane resin obtained by polymerization with polycarbonate diol, as synthetic leather for solving the above problems. Patent Literature 1 specifically discloses a porous sheet-shaped article obtained by allowing a urethane composition including a polyurethane formed from a polycarbonate diol, an organic isocyanate and a low molecular diol, and a polyurethane formed from a polyester-based diol, an organic diisocyanate and a low molecular diol to be incorporated or connected into a fiber base material and/or onto a fiber base material.

Patent Literature 2 discloses a porous sheet material obtained by a wet film-forming method involving providing a solution of a polyurethane resin formed from a high molecular diol, an organic isocyanate and, if necessary, a chain elongating agent, to a substrate. The porous sheet material is characterized in that the high molecular diol is a mixed diol of a polycarbonate diol and a polyester diol, the polycarbonate diol is a copolymerized polycarbonate diol which includes 1,4-butanediol and one or more of other alkane diols each having 4 to 6 carbon atoms, which contains 50 to 90% by mol of 1,4-butanediol based on the total molar number of the diol and which has a number average molecular weight of 500 to 5000, and the coagulation value of the polyurethane resin is 7 to 14.

Patent Literature 3 discloses a surface film layer of synthetic leather, obtained by using a polyurethane resin including a polyester polycarbonate diol obtained by a transesterification reaction of an aliphatic oligocarbonate diol obtained by a transesterification reaction of an aliphatic diol and a dialkyl carbonate, and a polyester polyol obtained by ring-opening addition polymerization of a cyclic ester compound with a compound having an active hydrogen group as an initiator, and a polyisocyanate and a chain extender.

Patent Literature 4 discloses a porous sheet material obtained by wet coagulation, characterized in that the porous sheet material is obtained by reacting a high molecular diol including an polycarbonate diol (a1) formed from an alkane diol having 4 or more and 6 or less carbon atoms and a polycarbonate diol (a2) formed from an alkane diol having 7 or more and 12 or less carbon atoms, both the polycarbonate diols being copolymerized polycarbonate diols and the percentages by weight of (a1) based on the total weight of (a1) and (a2) being 10% or more and 80% or less, an organic isocyanate and a chain elongating agent.

Patent Literature 5 discloses synthetic leather including a surface layer and a fiber cloth, in which the surface layer is formed from a surface layer material-forming composition for fiber laminates, the composition includes a main agent and a curing agent, the main agent is a polycarbonate diol obtained from 1,6-hexanediol and a low molecular carbonate, the curing agent includes a modified polyisocyanate (B1) of hexamethylene diisocyanate, having a number average molecular weight of 350 to 500 and an average number of functional groups (f) of $2 \leq f < 3$, and an isocyanurate-modified polyisocyanate (B2) of hexamethylene diisocyanate, having an average number of functional groups of $f \geq 3$, the (B1):(B2) equals to 50:50 to 95:5 (weight ratio), and both the main agent and the curing agent contain no organic solvent.

However, although having hydrolysis resistance, the synthetic leather disclosed in Patent Literatures 1 to 5 is not sufficient in sweat resistance in an application where high durability is required, for example, an automobile sheet.

Patent Literature 6 proposes synthetic leather formed of a specific polycarbonate diol (copolymerized polycarbonate diol derived from 1,5-pentanediol and 1,6-hexanediol) in order to provide synthetic leather which has excellent balance of physical properties such as sweat resistance and flexibility and furthermore which causes no crack or wrinkle during storage. However, the polycarbonate diol described in Patent Literature 6 requires the use of a large amount of an organic solvent in polyurethane polymerization, and is desired to be further improved from the viewpoint of environmental load.

Patent Literature 7 proposes a polyurethane for synthetic leather having excellent balance of physical properties including flexibility, chemical resistance, low-temperature characteristics, heat resistance and texture. There is here proposed a polyurethane for synthetic leather, obtained by reacting at least (a) a compound having two or more isocyanate groups in one molecule, (b) a chain extender and (c) a polycarbonate diol, in which the polycarbonate diol (c) is a polycarbonate diol having a hydroxyl value of 20 mg-KOH/g or more and 45 mg-KOH/g or less, having a glass transition temperature of −30° C. or less, as measured by a differential scanning calorimeter, and allowing a dihydroxy compound obtained by hydrolysis of the polycarbonate diol to have an average number of carbon atoms of 3 or more and 5.5 or less. However, the polyurethane for synthetic leather, disclosed in Patent Literature 7, also requires the use of a large amount of an organic solvent in polyurethane polymerization, and is not desirable from the viewpoint of environmental load.

In recent years, an environment-responsive polyurethane has been proposed. For example, Patent Literature 8 proposes a two-liquid-type non-solvent polyurethane for synthetic leather, the polyurethane including a urethane prepolymer composition used in the form of a high molecular product by a reaction of a crosslinking agent with active hydrogen in a component, in which the urethane prepolymer composition contains at least 20 to 80% by mass of a hydroxyl group-terminated urethane prepolymer having a hydroxyl value of 10 to 100 mgKOH/g and further contains 20 to 80% by mass of an oligomer having a hydroxyl value of 20 to 400 mgKOH/g and having no urethane bond, and capable of being crosslinked with the crosslinking agent while serving as a medium of the polymer, and is at least in the form of a liquid at a temperature of 30° C. with having a substantially 100% of a non-volatile content, and the polyurethane including 90 to 150% by equivalent of a polyisocyanate crosslinking agent having a NCO content of 5 to 35% by mass relative to the average hydroxyl value of the urethane prepolymer composition.

However, the polyurethane prepolymer composition for synthetic leather disclosed in Patent Literature 8 leads to the use of an ether-based polyol having a hydroxyl value of 20 to 400 mgKOH/g, such as poly-THF or THF-neopentyl glycol copolymerized polyol, as an oligomer having no urethane bond in order to achieve non-solvent composition, and thus has reduced heat resistance and has the problem of limited applications.

CITATION LIST

Patent Literatures

Patent Literature 1: Japanese Patent No. 3142102
Patent Literature 2: Japanese Patent Laid-Open No. 2003-119314
Patent Literature 3: Japanese Patent Laid-Open No. 2004-346094
Patent Literature 4: Japanese Patent No. 4177318
Patent Literature 5: Japanese Patent Laid-Open No. 2009-185260
Patent Literature 6: Japanese Patent Laid-Open No. 2013-108196
Patent Literature 7: Japanese Patent Laid-Open No. 2016-8234
Patent Literature 8: Japanese Patent Laid-Open No. 2014-105250

SUMMARY OF INVENTION

Technical Problem

In order to solve the above problems, an object of the present invention is to provide a curable composition capable of providing a cured product such as environment-responsive synthetic leather having excellent balance of physical properties including flexibility (texture), chemical resistance, low-temperature characteristics and heat resistance, and also allowing a smaller amount of solvent used, and synthetic leather produced by using the composition.

Solution to Problem

The present inventors have made intensive studies, and as a result, have found that environment-responsive synthetic leather having excellent balance of physical properties including flexibility (texture), chemical resistance, low-temperature characteristics and heat resistance, and also allowing decreased amount of solvent used can be provided by a curable composition including a polycarbonate diol having a predetermined structure or a predetermined isocyanate-terminated prepolymer derived from the polycarbonate diol, and a predetermined polyisocyanate, leading to completion of the present invention.

In other words, the present invention includes the following aspects.
  [1] A curable composition comprising:
    a component (a): a polycarbonate polyol having a hydroxyl value of 40 to 75 mgKOH/g;
    a component (b): a polycarbonate polyol having a hydroxyl value of 100 to 280 mgKOH/g; and
    a component (c): a polyisocyanate having an average number of functional groups per molecule, of 2 to 6.
  [2] A curable composition comprising:
    a component (d): an isocyanate-terminated prepolymer comprising a unit derived from a component (a) a polycarbonate polyol having a hydroxyl value of 40 to 75 mgKOH/g and a unit derived from a component (c) a polyisocyanate having an average number of functional groups per molecule, of 2 to 6; and
    a component (b): a polycarbonate polyol having a hydroxyl value of 100 to 280 mgKOH/g.
  [3] The curable composition according to [2], wherein an equivalent ratio [Isocyanate equivalent]/[Hydroxyl equivalent] between an isocyanate group of the component (c) and a hydroxyl group of the component (a) in synthesis of the isocyanate-terminated prepolymer is 1.5 to 3.0.
  [4] A curable composition comprising:
    a component (e): an isocyanate-terminated prepolymer comprising a unit derived from a component (b) a polycarbonate polyol having a hydroxyl value of 100 to 280 mgKOH/g and a unit derived from a component (c) a polyisocyanate having an average number of functional groups per molecule, of 2 to 6; and
    a component (a): a polycarbonate polyol having a hydroxyl value of 40 to 75 mgKOH/g.
  [5] The curable composition according to [4], wherein an equivalent ratio [Isocyanate equivalent]/[Hydroxyl equivalent] between an isocyanate group of the component (c) and a hydroxyl group of the component (b) in synthesis of the isocyanate-terminated prepolymer is 1.5 to 3.0.
  [6] The curable composition according to any of [1] to [5], wherein the polycarbonate polyol has a repeating unit represented by the following formula (1) and a terminal hydroxyl group:

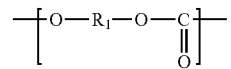

wherein $R^1$ is a divalent aliphatic or alicyclic hydrocarbon having 2 to 15 carbon atoms.
  [7] The curable composition according to any of [1] to [6], wherein the polycarbonate polyol comprises a structure represented by the following formula (A):

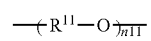

wherein each $R^{11}$ is a divalent linear, branched or cyclic aliphatic hydrocarbon group having 2 or more and 20 or less carbon atoms, or an aromatic hydrocarbon group, a plurality of $R^{11}$(s) may be the same as or different from each other, and n11 is an integer of 1 or more.
  [8] The curable composition according to [6], wherein 50% by mol or more of the repeating unit represented by the formula (1) comprises at least two repeating units selected from the following formula (2), formula (3), and formula (4).

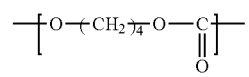

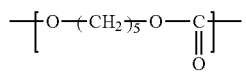

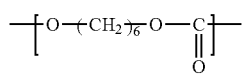

[9] The curable composition according to any of [1] to [8], comprising 40% by mass or less of an inert organic solvent based on a total amount of the curable composition.

[10] The curable composition according to any of [1] to [9], comprising 50% by mass or less of a polyester polyol based on a total amount of the curable composition.

[11] Synthetic leather produced from the curable composition according to any of [1] to [10].

Advantageous Effects of Invention

According to the present invention, a curable composition capable of providing a cured product such as environment-responsive synthetic leather having excellent balance of physical properties including flexibility (texture), chemical resistance, low-temperature characteristics and heat resistance, and also allowing a small amount of solvent used, and synthetic leather produced by using the composition.

BRIEF DESCRIPTION OF DRAWINGS

FIG. 1 A cross-sectional view of one example of synthetic leather produced by using the curable composition of the present invention.

FIG. 2 A diagram illustrating one example of a production process chart of synthetic leather by use of the curable composition of the present invention.

DESCRIPTION OF EMBODIMENTS

Hereinafter, a mode for carrying out the present invention (hereinafter, abbreviated as "the present embodiment".) is described in detail. The present invention is not limited to the following embodiments, and can be variously modified and then carried out within the gist thereof.

A composition of the present embodiment (hereinafter, sometimes referred to as "curable composition 1".) is a curable composition including:
 a component (a): a polycarbonate polyol having a hydroxyl value of 40 to 75 mgKOH/g;
 a component (b): a polycarbonate polyol having a hydroxyl value of 100 to 280 mgKOH/g; and
 a component (c): a polyisocyanate having an average number of functional groups per molecule, of 2 to 6.

The curable composition of the present embodiment is cured to thereby, namely, react the component (a) and the component (b), with the component (c) to form a polyurethane (cured product). The composition of the present embodiment can be used as a curable composition for synthetic leather, and the polyurethane obtained by the reaction can be used in synthetic leather.

The component (a), the component (b) and the component (c) are used in the curable composition of the present embodiment.

The curable composition of the present embodiment may be a curable composition as a mixture obtained by compounding the component (a), the component (b) and the component (c) constituting the composition, and may be a curable composition as a mixture obtained by preparing an isocyanate-terminated prepolymer composition (namely, an isocyanate-terminated prepolymer including a unit derived from the component (a) or (b) and a unit derived from the component (c)) obtained by reacting the component (a) or the component (b) with the component (c) in advance, and compounding the isocyanate-terminated prepolymer composition (isocyanate-terminated prepolymer) and the component (b) or the component (a). Accordingly, the composition of the present embodiment also encompasses curable compositions according to the following two aspects. Herein, the following two aspects can be each achieved by a prepolymer method described below.

In other words, one composition of the present embodiment is a curable composition (hereinafter, sometimes referred to as "curable composition 2".) including:
 a component (d):
  an isocyanate-terminated prepolymer including a unit derived from a component (a) a polycarbonate polyol having a hydroxyl value of 40 to 75 mgKOH/g and a unit derived from a component (c) a polyisocyanate having an average number of functional groups per molecule, of 2 to 6; and
 a component (b): a polycarbonate polyol having a hydroxyl value of 100 to 280 mgKOH/g.

The curable composition 2 is, for example, a curable composition for synthetic leather, including a component (d): an isocyanate-terminated prepolymer composition obtained by reacting a component (a): a polycarbonate polyol having a hydroxyl value of 40 to 75 mgKOH/g and a component (c): a polyisocyanate having an average number of functional groups per molecule, of 2 to 6, in advance at an equivalent ratio [Isocyanate equivalent]/[Hydroxyl equivalent] of 1.5 to 3.0, and a component (b): a polycarbonate polyol having a hydroxyl value of 100 to 280 mgKOH/g.

One composition of the present embodiment is a curable composition (hereinafter, sometimes referred to as "curable composition 3".) including
 a component (e):
  an isocyanate-terminated prepolymer including a unit derived from a component (b) a polycarbonate polyol having a hydroxyl value of 100 to 280 mgKOH/g and a unit derived from a component (c) a polyisocyanate having an average number of functional groups per molecule, of 2 to 6; and
 a component (a): a polycarbonate polyol having a hydroxyl value of 40 to 75 mgKOH/g.

The curable composition 3 is, for example, a curable composition including a component (e): an isocyanate-terminated prepolymer composition obtained by reacting a component (b): a polycarbonate polyol having a hydroxyl value of 100 to 280 mgKOH/g and a component (c): a polyisocyanate having an average number of functional groups per molecule, of 2 to 6, in advance at an equivalent ratio [Isocyanate equivalent]/[Hydroxyl equivalent] of 1.5 to 3.0, and a component (a): a polycarbonate polyol having a hydroxyl value of 40 to 75 mgKOH/g.

The isocyanate-terminated prepolymer compositions as the component (d) and the component (e) may each include an unreacted component (c) and/or an unreacted component (a) or component (b).

Synthetic leather obtained from the curable composition of the present embodiment has excellent balance of physical properties including flexibility (texture), chemical resistance, low-temperature characteristics and heat resistance. Synthetic leather obtained from the curable composition of the present embodiment is environment-responsive synthetic leather which can be produced with a decreased amount of solvent used.

<Component (a) and Component (b)>

In the curable composition of the present embodiment, at least two polycarbonate polyols (hereinafter, respective polycarbonate polyols as the components (a) and (b) are sometimes referred to as "polycarbonate polyol (a)" and "polycarbonate polyol (b)".) different in hydroxyl value are used. It is considered that such two polycarbonate polyols different in hydroxyl value are high in solubility in a solvent regardless of the amount of a hydroxyl group and thus can allow synthetic leather to be produced with a decreased amount of solvent used as compared with other polycarbonate polyols. It is also considered that advantages of a polycarbonate polyol low in hydroxyl value (high in molecular weight) and advantages of a polycarbonate polyol high in hydroxyl value (low in molecular weight) are well balanced and the balance of physical properties including flexibility (texture), chemical resistance, low-temperature characteristics and heat resistance is excellent.

One of the polycarbonate polyols for use in the curable composition of the present embodiment is a polycarbonate polyol (component (a)) having a hydroxyl value of 40 to 75 mgKOH/g. The hydroxyl value of the component (a) is preferably 45 to 70 mgKOH/g, further preferably 50 to 65 mgKOH/g.

The hydroxyl value of the component (a) is 40 mgKOH/g or more and thus the viscosity of a curable composition obtained can be kept low and the amount of an organic solvent used can be decreased. The hydroxyl value of the component (a) is 75 mgKOH/g or less and thus synthetic leather obtained tends to be enhanced in flexibility (texture) and low-temperature characteristics.

The melt viscosity at 50° C. of the component (a) is preferably 3000 to 25000 mPa·s, more preferably 5000 to 18000 mPa·s, further preferably 7000 to 16000 mPa·s. The melt viscosity at 50° C. of the component (a) is 3000 mPa·s or more and thus synthetic leather obtained tends to be enhanced in flexibility and low-temperature characteristics. The melt viscosity at 50° C. of the component (a) is 25000 mPa·s or less and thus the viscosity of a curable composition obtained can be kept low and the amount of an organic solvent used can be decreased.

One of the polycarbonate polyols for use in the curable composition of the present embodiment is a polycarbonate polyol (component (b)) having a hydroxyl value of 100 to 280 mgKOH/g. The hydroxyl value of the component (b) is preferably 130 to 250 mgKOH/g, more preferably 160 to 240 mgKOH/g.

The hydroxyl value of the component (b) is 100 mgKOH/g or more and thus the viscosity of a curable composition obtained can be kept low and the amount of an organic solvent used can be decreased. The hydroxyl value of the component (b) is 280 mgKOH/g or less and thus synthetic leather obtained has excellent flexibility (texture) and low-temperature characteristics.

The melt viscosity at 50° C. of the component (b) is preferably 150 to 600 mPa·s, more preferably 180 to 500 mPa·s, further preferably 200 to 400 mPa·s. The melt viscosity at 50° C. of the polycarbonate polyol (b) is 150 mPa·s or more and thus synthetic leather obtained tends to have excellent flexibility (texture) and low-temperature characteristics. The melt viscosity at 50° C. of the component (b) is 600 mPa·s or less and thus the viscosity of a curable composition obtained can be kept low and the amount of an organic solvent used can be decreased.

The average number of hydroxyl groups in each one molecule of the component (a) and the component (b) is preferably 1.7 to 3.5, more preferably 1.8 to 3.0, further preferably 2.0 to 2.5.

The component (a) and the component (b) are each preferably a polycarbonate polyol having a repeating unit represented by formula (1) and a terminal hydroxyl group. The respective proportions of the repeating units represented by the formula (1), in the component (a) and the component (b), are each preferably 60% by mol or more. The respective proportions of the repeating units represented by the formula (1), in the component (a) and the component (b), are each preferably 60% by mol or more from the viewpoint of the balance among flexibility (texture), chemical resistance, low-temperature characteristics and heat resistance of the curable composition. In the present embodiment, the structure of the polycarbonate polyol as the component (a) and the structure of the polycarbonate polyol as the component (b) may be the same or different.

In the formula (1), $R^1$ represents a divalent aliphatic or alicyclic hydrocarbon having 2 to 15 carbon atoms.

The component (a) and the component (b) are not particularly limited and can be, for example, synthesized by using a bifunctional diol compound, if necessary, a tri- or higher functional polyhydric alcohol, and carbonic acid ester, as raw materials, according to a transesterification reaction described in, for example, "Polymer Reviews vol. 9, pages 9 to 20".

The bifunctional diol compound for use in the transesterification reaction is not particularly limited, and examples thereof include diols each having a divalent aliphatic or alicyclic hydrocarbon backbone having 2 to 15 carbon atoms. Specific examples of the bifunctional diol compound include ethylene glycol, 1,3-propanediol, 2-methyl-1,3-propanediol, 1,4-butanediol, neopentyl glycol, 1,5-pentanediol, 1,6-hexanediol, 1,7-heptanediol, 1,8-octanediol, 1,9-nonanediol, 1,10-decanediol, 2-methyl-1,8-octanediol, 1,11-undecanediol, 1,12-dodecanediol, 1,13-tridecanediol, 1,14-tetradecanediol, 1,15-pentadecanediol, 2-isopropyl-1,4-butanediol, 2-ethyl-1,6-hexanediol, 3-methyl-1,5-pentanediol, 2,4-dimethyl-1,5-pentanediol, 2,4-diethyl-1,5-pentanediol, 1,3-cyclohexanediol, 1,4-cyclohexanediol and 1,4-cyclohexanedimethanol.

Such a bifunctional diol compound may be used singly or in combinations of two or more kinds thereof.

In particular, an alkylene diol having 3 to 9 carbon atoms is preferable and an alkylene diol having 4 to 6 carbon atoms is more preferable, from the viewpoint that a curable composition having excellent flexibility (touch), chemical resistance, low-temperature characteristics and heat resistance is obtained. Two or more kinds of alkylene diols are preferably used in combination.

The bifunctional diol compound has 2 or more carbon atoms and thus not only the viscosity of the curable composition can be kept low and the amount of an organic solvent used can be decreased, but also synthetic leather obtained tends to be enhanced in flexibility and low-temperature characteristics. The bifunctional diol compound has 15 or less carbon atoms and thus synthetic leather obtained tends to have excellent chemical resistance.

Two or more kinds of the bifunctional diol compounds are used in combination and thus a polycarbonate diol obtained has reduced regularity of a structural unit and reduced crystallinity, resulting in a tendency to obtain a liquid polycarbonate diol at ordinary temperature (25° C.). Thus, the amount of an organic solvent used tends to be able to be decreased.

In the present embodiment, not only such a bifunctional diol, but also, if necessary, a tri- or higher functional polyhydric alcohol compound can be used as each raw material of the component (a) and the component (b).

The polyhydric alcohol compound is not particularly limited, and examples thereof include trimethylolethane, trimethylolpropane, hexanetriol, pentaerythritol and glycerin. Such a polyhydric alcohol is used and thus the average number of hydroxyl groups in each one molecule of the component (a) and the component (b) tends to be able to be easily adjusted in the range of 1.7 to 3.5.

In the present embodiment, 50% by mol or more of the repeating unit represented by the formula (1) preferably includes at least two repeating units selected from formula (2), formula (3) and formula (4). The contents of the repeating units of the formula (2), formula (3) and formula (4) are each preferably 70% by mol or more, further preferably 80% by mol or more.

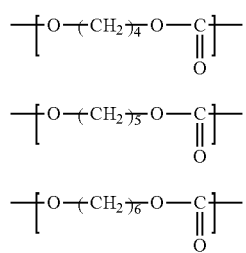

Such at least two repeating units selected from the formula (2), formula (3) and formula (4) are included at 50% by mol or more relative to the repeating unit represented by the formula (1) and thus synthetic leather obtained has excellent flexibility (touch), chemical resistance, low-temperature characteristics and heat resistance, and also tends to allow decreased amount of an inert organic solvent used. The upper limit of the proportion (% by mol) of the at least two repeating units selected from the formula (2), formula (3) and formula (4) relative to the repeating unit represented by formula (1) is not particularly limited, and is usually 100% by mol or less.

In the present embodiment, in a case where two repeating units are selected from the formula (2), formula (3) and formula (4), the ratio between the two repeating units (hereinafter, also designated as "ratio of copolymerization") on a molar ratio is 90:10 to 10:90, preferably 70:30 to 30:70, more preferably 60:40 to 40:60. The ratio of copolymerization is in the above range and thus the crystallinity of a polycarbonate diol tends to be reduced to thereby obtain synthetic leather having high flexibility, favorable low-temperature characteristics and touch. Furthermore, the ratio of copolymerization is in this range and thus the amount of an inert organic solvent used tends to be able to be decreased.

In the present embodiment, in a case where three repeating units are selected from the formula (2), formula (3) and formula (4), the proportion of each of the structural units of the formula (2), formula (3) and formula (4) is preferably 5% by mol or more, more preferably 10% by mol or more, further preferably 20% by mol or more under the assumption that the total of such three repeating units of the formula (2), formula (3) and formula (4) is 100% by mol. The proportion of each of such three repeating units of the formula (2), formula (3) and formula (4) in the total of such three repeating units of the formula (2), formula (3) and formula (4) is in the above range and thus the crystallinity of a polycarbonate diol tends to be reduced to thereby obtain synthetic leather having high flexibility, favorable low-temperature characteristics and touch. Furthermore, the proportion of each of such three repeating units of the formula (2), formula (3) and formula (4) is in the above range and thus the amount of an inert organic solvent used tends to be able to be decreased.

Examples of the carbonic acid ester which can be used for synthesis of the component (a) and the component (b) include dialkyl carbonates such as dimethyl carbonate, diethyl carbonate, dipropyl carbonate and dibutyl carbonate; diaryl carbonates such as diphenyl carbonate; and alkylene carbonates such as ethylene carbonate, trimethylene carbonate, 1,2-propylene carbonate, 1,2-butylene carbonate, 1,3-butylene carbonate and 1,2-pentylene carbonate. The carbonic acid ester here used is preferably dimethyl carbonate, diethyl carbonate, diphenyl carbonate or ethylene carbonate from the viewpoints of availability and ease of condition setting of a polymerization reaction.

A catalyst may or may not be added in production of the component (a) and the component (b). In a case where a catalyst is added, the catalyst can be freely selected from catalysts for use in a usual transesterification reaction. The catalyst here used is, for example, any of metals such as lithium, sodium, potassium, rubidium, cesium, magnesium, calcium, strontium, barium, zinc, aluminum, titanium, cobalt, germanium, tin, lead, antimony, arsenic and cerium, and metal salts thereof, metal alkoxides thereof and organic compounds including such metals. Among these catalysts, an organic compound including titanium, tin, or lead is preferable. The amount of the catalyst used is usually 0.00001 to 0.1% based on the mass of the bifunctional diol compound as a raw material and the tri- or higher functional polyhydric alcohol, if necessary, optionally included.

The method for producing the component (a) and the component (b) in the present embodiment can include synthesis by a transesterification reaction using the bifunctional diol compound, if necessary, the tri- or higher functional polyhydric alcohol, and the carbonic acid ester as raw materials, as described above.

More specifically, the transesterification reaction is performed according to the following procedure.

First, one or more bifunctional diol compounds at a predetermined ratio, if necessary, one or more tri- or higher functional polyhydric alcohols at a predetermined ratio, and one or more carbonic acid esters at a predetermined ratio are admixed and subjected to a transesterification reaction under ordinary pressure or reduced pressure in the presence or absence of a transesterification catalyst at a temperature of 100 to 200° C., preferably 140 to 180° C.

Subsequently, any alcohol formed during the reaction and derived from the carbonic acid esters is distilled off to thereby obtain a polycarbonate diol having a molecular weight of about 300 to 500 g/mol.

Next, unreacted carbonic acid esters and bifunctional diols, and tri- or higher functional polyhydric alcohols optionally included are distilled off under reduced pressure at 130 to 230° C., preferably 150 to 200° C., and the component (a) and the component (b) each having a desired hydroxyl value can be obtained by a condensation reaction.

The compositional ratio between the component (a) and the component (b) and the average number of hydroxyl groups in each one molecule in the components can be adjusted by controlling the initial ratio of components loaded, the amounts of raw materials distilled off in production, and the amount of a reaction product.

In the present embodiment, a preferable mass ratio between the component (a) and the component (b) is preferably 60 to 90% by mass, more preferably 70 to 85% by mass, further preferably 75 to 80% by mass in terms of the proportion of the component (a) included in a case where the total of the component (a) and the component (b) is 100% by mass. The proportion of the component (a) is 60% by mass or more and thus synthetic leather obtained tends to have superior flexibility (texture) and low-temperature characteristics. The proportion of the component (a) is 90% by mass or less and thus the viscosity of a curable composition obtained tends to be able to be kept low and the amount of an organic solvent used tends to be able to be decreased.

The component (a) and the component (b) are used in the curable composition of the present embodiment, and the component (a) and the component (b) (polycarbonate polyol) may each include, if necessary, for example, a structure represented by the following formula (A) and/or a polyester polyol structure in one molecule.

(A)

In the formula (A), each $R^{11}$ is a divalent linear, branched or cyclic aliphatic hydrocarbon group having 2 or more and 20 or less carbon atoms, or an aromatic hydrocarbon group. A plurality of $R^{11}$(s) may be the same as or different from each other, and n11 is an integer of 1 or more.

As described above, n11 in the formula (A) may be any integer of 1 or more. The structure represented by the formula (A) may be either long-chain or short-chain structure. For example, n11 in a long-chain structure represented by the formula (A) can be preferably 12 or more.

The method for producing components (a) and (b) each including the above formula (A) in one molecule is not particularly limited, and examples include a transesterification reaction of the above formula (A) with the component (a) and the component (b) (polycarbonate polyols).

The mass proportion of such polycarbonate polyol components (the component (a) and the component (b)) based on the total mass of such polycarbonate polyol components and the structure represented by the formula (A) in one molecule is preferably 50% by mass or more, more preferably 60% by mass or more. The mass proportion of the component (a) and the component (b) based on the total mass of such polycarbonate polyol components (the component (a) and the component (b)) and any polyol other than the components is preferably 50% by mass or more, more preferably 60% by mass or more. The mass proportion of such a polycarbonate polyol component (component (a) or component (b)) in one molecule is 50% by mass or more and thus synthetic leather to be formed tends to have excellent balance among flexibility (touch), chemical resistance, low-temperature char- acteristics and heat resistance. On the other hand, the structure represented by the formula (A) and such any other polyol can be imparted to a molecule of such a polycarbonate polyol to thereby contribute to the effect of reducing the viscosity of the curable composition of the present embodiment, and these polyols can be used in combination as long as no performance is impaired.

While the component (a) and the component (b) are used in the curable composition of the present embodiment, any polyol other than the component (a) and the component (b) may be, if necessary, used in combination. Such any polyol other than the component (a) and the component (b) is not particularly limited as long as it can be used in usual polyurethane production, and examples thereof include a polyether polyol, a polyester polyol, an acrylic polyol, a polyolefin polyol, a castor oil polyol, and any polycarbonate polyol other than the component (a) and the component (b).

The mass proportion of the component (a) and the component (b) based on the total mass of the component (a) and the component (b) and any polyol other than the components is preferably 50% by mass or more, more preferably 70% by mass or more. The mass proportion of the component (a) and the component (b) is 50% by mass or more and thus synthetic leather to be formed tends to have excellent balance among flexibility (touch), chemical resistance, low-temperature characteristics and heat resistance. On the other hand, addition of such any polyol other than the components can contribute to the effect of reducing the viscosity of the curable composition of the present embodiment and these polyols can be used in combination as long as no performance is impaired.

<Component (c)>

A polyisocyanate having an average number of functional groups per molecule, of 2 to 6 (component (c)), is used in the curable composition of the present embodiment.

Examples of the component (c) in the present embodiment can include aromatic diisocyanates such as 2,4-tolylene diisocyanate, 2,6-tolylene diisocyanate and a mixture thereof, diphenylmethane-4,4'-diisocyanate (MDI), naphthalene-1,5-diisocyanate (NDI), 3,3'-dimethyl-4,4'bi- phenylene diisocyanate (TODI) and polymethylenepolyphe- nylene polyisocyanate (PMDI); aromatic aliphatic diisocya- nates such as xylylene diisocyanate (XDI) and phenylene diisocyanate; aliphatic diisocyanates such as 4,4'-methylen- ebiscyclohexyl diisocyanate (hydrogenation (also referred to as hydrogenated) MDI), hexamethylene diisocyanate (HDI), isophorone diisocyanate (IPDI) and cyclohexane diisocya- nate (hydrogenated XDI), and various Duranates such as A201H manufactured by Asahi Kasei Corporation.

The component (c) for use in the present embodiment can also be a polyisocyanate having 2.1 or more isocyanate groups on average in one molecule. The polyisocyanate having 2.1 or more isocyanate groups on average in one molecule can be any of aromatic polyisocyanates such as crude MDI and crude TDI; derivatives of aliphatic isocya- nates such as HDI and IPDI, specifically diisocyanate derivatives such as biuret, allophanate, uretdione and iso- cyanurate; and polyhydric alcohol adducts.

The polyisocyanate having 2.1 or more isocyanate groups in one molecule is not particularly limited, and is, for example, available as any of Sumijule 44S and 44V70 (both manufactured by Sumika Bayer Urethane Co., Ltd.), Des- modur HL (manufactured by Sumika Bayer Urethane Co., Ltd.) as a copolymer of TDI and HDI, various Duranates manufactured by Asahi Kasei Corporation, namely, Duran- ate 24A-100, Duranate 22A-75PX, Duranate 18H-70B, Duranate 21S-75E, Duranate THA-100, Duranate TPA-100, Duranate MFA-75X, Duranate TSA-100, Duranate TSS-100, Duranate TSE-100, Duranate D-101, Duranate D-201, Duranate P-301-75E, Duranate E-402-90T, Duranate E-405-80T, Duranate ME20-100, Duranate 17B-60PX, Duranate TPA-B80X, Duranate MF-B60X, Duranate E-402-B80T, Duranate ME20-B80S, Duranate WB40-100, Duranate WB40-80D, Duranate WT20-100 and Duranate WT30-100.

Furthermore, the component (c) here used can also be, for example, a so-called blocked isocyanate obtained by blocking with any known blocking agent, for example, lower alcohols such as butanol and 2-ethylhexanol, methyl ethyl ketone oxime, lactams, phenols, imidazoles, and active methylene compounds.

The amount of the component (c) used is adjusted so that the amount represented as [Isocyanate equivalent of component (c)]/[Total of hydroxyl equivalents of both component (a) and component (b)] is preferably 0.7 to 1.3, more preferably 0.8 to 1.2, further preferably 0.9 to 1.1. The [Isocyanate equivalent of component (c)]/[Total of hydroxyl equivalents of both component (a) and component (b)] is 0.7 or more and 1.3 or less and thus a polyurethane obtained can be properly controlled in molecular weight and mechanical properties such as strength, elongation and wear resistance tend to be excellent.

The component (c) here used is preferably an aromatic polyisocyanate such as MDI. Such an aromatic polyisocyanate is used to result in a tendency to obtain synthetic leather having excellent mechanical properties. A curable composition, in which such an aromatic polyisocyanate such as MDI is used as the component (c), can be suitably used mainly as an adhesive of a base fabric and a skin layer of synthetic leather. A curable composition, in which an aliphatic polyisocyanate such as hydrogenated MDI is used as the component (c), can provide synthetic leather having superior weather resistance than the curable composition described above and thus is suitably used as a curable composition for a skin layer.

<Chain Extender>

A chain extender can be, if necessary, used in the curable composition of the present embodiment. The chain extender is appropriately, if necessary, used because the chain extender, while is used for enhancing wear properties and strength of a polyurethane obtained, may also cause a polyurethane obtained to be deteriorated in flexibility. The chain extender is not particularly limited, and examples thereof include short-chain diols such as ethylene glycol and 1,4-butanediol; and polyhydric alcohols such as trimethylolethane, trimethylolpropane, hexanetriol, pentaerythritol and glycerin. The chain extender is not particularly limited and examples thereof include diamines such as ethylenediamine, propylenediamine, hexamethylenediamine, tolylenediamine, xylynenediamine, diphenyldiamine, diaminodiphenylmethane, diaminocyclohexylmethane, piperazine, 2-methylpiperazine and isophoronediamine, and water.

The amount of the chain extender added based on the total of the component (a) and the component (b) is preferably 30% by mass or less, more preferably 3% by mass or more and 20% by mass or less, further preferably 5% by mass or more and 10% by mass or less. It is desirable to also adjust the amount of isocyanate according to the amount of the chain extender added. For example, the amount of the chain extender is adjusted so that the isocyanate equivalent of the component (c) used based on the total obtained by adding the equivalent of a functional group of the chain extender to the total of the hydroxyl equivalents of both the component (a) and the component (b) is preferably 0.7 to 1.3 equivalents, more preferably 0.8 to 1.2 equivalents, further preferably 0.9 to 1.1 equivalents.

The chain extender can be used in order to adjust physical properties such as strength, wear properties and flexibility of a polyurethane after curing. The chain extender here used can be a polyhydric alcohol to thereby allow a polyurethane obtained to be increased in crosslinking density and enhanced in strength, wear properties and chemical resistance, and allow a curable composition obtained to be suitably used particularly as a skin material of synthetic leather.

<Inert Organic Solvent>

The curable composition of the present embodiment may include, if necessary, an inert organic solvent in order to adjust workability in urethane production. The content of the inert organic solvent based on the total amount of the curable composition is preferably 40% by mass or less, more preferably 3% by mass or more and 30% by mass or less, further preferably 5% by mass or more and 20% by mass or less. Addition of the inert organic solvent is effective in order to not only decrease the viscosity of the curable composition and enhance workability in synthetic leather production, but also more enhance the appearance of synthetic leather obtained. In this regard, the content of the inert organic solvent is preferably kept low from the viewpoint of a reduction in environmental load.

The inert organic solvent is not particularly limited as long as it is an organic solvent substantially inert to a polyisocyanate, and is preferably one having no active hydrogen. The inert organic solvent is not particularly limited, and examples thereof include hydrocarbons such as pentane, hexane, heptane, octane, decane, petroleum ether, petroleum benzine, ligroin, petroleum spirits, cyclohexane and methylcyclohexane; fluorine-based inert liquids, for example, fluorinated oils such as trichlorofluoroethane, tetrachlorodifluoroethane and perfluoroether; and perfluorocyclohexane, perfluorobutyltetrahydrofuran, perfluorodecalin, perfluoro-n-butylamine, perfluoropolyether and dimethylpolysiloxane. These may be used singly or as a mixture thereof. Examples of the inert organic solvent further include any single or mixed solvent of methyl ethyl ketone (also designated as MEK), acetone, ethyl acetate, butyl acetate, toluene, xylene, dimethylformamide (DMF), dimethylsulfoxide, diethylformamide, dimethylacetamide, N-methylpyrrolidone, N-ethylpyrrolidone, tetrahydrofuran (THF) and dioxane.

<Polyester Polyol>

The curable composition of the present embodiment may usually contain, if necessary, 50% by mass or less, preferably 5% by mass or more and 40% by mass or less, more preferably 10% by mass or more and 30% by mass or less of a polyester polyol based on the total amount of the curable composition in order to improve workability and adhesiveness to a base fabric in synthetic leather production. The polyester polyol can be contained to result in tendencies to decrease the viscosity of the curable composition and improve adhesiveness to a polyester fiber as a representative base fabric. The content of the polyester polyol is 50% by mass or less and thus resistance to moist heat (hydrolyzability) tends to be enhanced.

The polyester polyol is not particularly limited, and examples thereof include ethylene glycol adipate, propanediol adipate, butanediol adipate, 3-methyl-1,5-pentanediol adipate and polycaprolactone polyol. The hydroxyl value of the polyester polyol is preferably 25 to 200 mgKOH/g, more preferably 30 to 130 mgKOH/g, further preferably 40 to 70 mgKOH/g.

<Other Additive(s)>

Any additive(s) such as a curing accelerator (catalyst), a filler, a flame retardant, a dye, an organic or inorganic pigment, a release agent, a fluidity modifier, a plasticizer, an antioxidant, an ultraviolet absorber, a light stabilizer, a defoamer, a leveling agent, a colorant and/or a foaming agent can be added to the curable composition of the present embodiment depending on the intended use.

The curing accelerator is not particularly limited, and examples thereof include amines and a metal catalyst.

The curing accelerator being any of amines is not particularly limited, and examples thereof include monoamines such as triethylamine and N,N-dimethylcyclohexylamine, diamines such as tetramethylethylenediamine, and triamines, cyclic amines, alcohol amines such as dimethylethanolamine, and ether amines.

The metal catalyst is not particularly limited, and examples thereof include potassium acetate, potassium 2-ethylhexanoate, calcium acetate, lead octylate, dibutyltin dilaurate, tin octylate, bismuth neodecanoate, bismuth oxycarbonate, bismuth 2-ethylhexanoate, zinc octylate, zinc-neodecanoate, phosphine and phosphorine.

The filler and the pigment are not particularly limited, and examples thereof include a woven fabric, a glass fiber, a carbon fiber, a polyamide fiber, mica, kaolin, bentonite, a metal powder, an azo pigment, carbon black, clay, silica, talc, gypsum, alumina white and barium carbonate.

The release agent, the fluidity modifier and the leveling agent are not particularly limited, and examples thereof include silicone, aerosil, wax, stearate and polysiloxane such as BYK-331 (manufactured by BYK-Chemie).

The additives for use in the present embodiment are preferably at least an antioxidant, a light stabilizer and a heat stabilizer.

The antioxidant here used is not particularly limited, and can be, for example, any of phosphorus compounds such as aliphatic, aromatic or alkyl-substituted aromatic esters of phosphoric acid or phosphorus acid, hypophosphorous acid derivatives, phenylphosphonic acid, phenylphosphinic acid, diphenylphosphonic acid, polyphosphonate, dialkyl pentaerythritol diphosphite and dialkylbisphenol A diphosphite; phenol-based derivatives, in particular, hindered phenol compounds, and sulfur-containing compounds such as thioether-based, dithionic acid salt-based, mercaptobenzimidazole-based, and thiocarbanilide-based compounds and thiodipropionic acid esters; and tin-based compounds such as tin malate and dibutyltin monooxide. These may be used singly or in combinations of two or more kinds thereof.

<Method for Producing Curable Composition>

The curable composition of the present embodiment can be produced by a production method generally industrially used.

The curable composition of the present embodiment can be produced by, for example, a method (hereinafter, referred to as "one-shot method") involving collectively mixing and reacting the component (a), the component (b) and the component (c).

The curable composition of the present embodiment can be produced by, for example, any of a method (hereinafter, referred to as "prepolymer method") involving first reacting the component (a) and the component (c) in advance to prepare a prepolymer composition having an isocyanate group at a terminal thereof, and then compounding the component (b), and a method (this method is also classified to "prepolymer method") involving first reacting the component (b) and the component (c) in advance to prepare a prepolymer composition having an isocyanate group at a terminal thereof, and then compounding the component (a).

(One-Shot Method)

In a case where the curable composition is obtained by the one-shot method, the amount of the component (c) used is usually preferably 0.7 to 1.3 equivalents, more preferably 0.8 to 1.2 equivalents, further preferably 0.9 to 1.1 equivalents in terms of isocyanate equivalent based on the total of the hydroxyl equivalents of both the component (a) and the component (b). The amount of the component (c) used is 0.7 equivalents or more and 1.3 equivalents or less and thus the molecular weight of a polyurethane obtained can be properly controlled and mechanical properties such as strength, elongation and wear resistance tend to be excellent. In a case where the curable composition is obtained by the one-shot method, an inert organic solvent can be used for the purpose of an improvement in workability in synthetic leather production. In general, a polyol (corresponding to the component (a) or the component (b)) and a polyisocyanate (corresponding to the component (c)) are mixed to result in an increase in viscosity of a curable mixture over time. The inert organic solvent is added to the curable composition and thus the composition tends to be able to be decreased in viscosity and elongated in time which can be taken for coating.

In a case where such other additive(s) is(are) used, such other additive(s) may be added at the same time as collective mixing of the component (a), the component (b) and the component (c), or may be mixed with the component (a) and/or the component (b) in advance.

(Prepolymer Method)

Examples of the prepolymer method include a method involving reacting the component (a) and the component (c) in advance to prepare an isocyanate group-terminated prepolymer composition (also simply referred to as prepolymer composition), thereby synthesizing an isocyanate group-terminated prepolymer, and then adding the component (b).

Examples of the prepolymer method also include a method involving reacting the component (b) and the component (c) in advance to prepare an isocyanate-terminated prepolymer composition, and then adding the component (a).

The ratio between the component (a) or the component (b) and the component (c) in prepolymer synthesis is adjusted so that the equivalent ratio [Isocyanate equivalent]/[Hydroxyl equivalent] between an isocyanate group included in the component (c) and a hydroxyl group included in the component (a) or the component (b) is 1.5 to 3.0, preferably 1.8 to 2.7, more preferably 1.9 to 2.3. The [Isocyanate equivalent]/[Hydroxyl equivalent] in prepolymer synthesis is 1.5 or more and thus the molecular weight of a prepolymer obtained can be properly controlled and the viscosity of the prepolymer can be decreased, and use of the organic solvent can be decreased. The [Isocyanate equivalent]/[Hydroxyl equivalent] in prepolymer synthesis is 3.0 or less and thus the unreacted component (c) tends to be able to be decreased and a polyurethane obtained tends to be able to be inhibited from being hardened.

The ratio of the isocyanate group-terminated prepolymer composition obtained by reacting the component (a) and the component (c) in advance (namely, the isocyanate group-terminated prepolymer obtained by reacting the component (a) and the component (c) in advance) to the component (b), or the ratio of the isocyanate group-terminated prepolymer composition obtained by reacting the component (b) and the component (c) in advance (namely, the isocyanate group-terminated prepolymer obtained by reacting the component (b) and the component (c) in advance) to the component (a), is preferably 0.7 to 1.3, more preferably 0.8 to 1.2, further preferably 0.9 to 1.1, in terms of [Isocyanate equivalent of prepolymer composition (namely, prepolymer)]/[Hydroxyl value equivalent of component (a) or component (b)]. The [Isocyanate equivalent of prepolymer composition (namely, prepolymer)]/[Hydroxyl value equivalent of component (a) or component (b)] is 0.7 equivalents or more and 1.3 equivalents or less and thus the molecular weight of a polyurethane obtained can be properly controlled and mechanical properties such as strength, elongation and wear resistance tend to be excellent.

In a case where the curable composition is obtained by the prepolymer method, an inert organic solvent can be used for the purpose of an improvement in workability in synthetic leather production. The amount of the inert organic solvent used is preferably 40% by mass or less. The isocyanate-terminated prepolymer composition and the polycarbonate polyols are mixed to result in an increase in viscosity of the curable composition over time. The inert organic solvent is added to the curable composition and thus the composition tends to be able to be decreased in viscosity and elongated in time which can be taken for coating.

The inert organic solvent is used to result in an increase in viscosity during prepolymer synthesis, and thus a prepolymer reaction is preferably performed after the inert organic solvent is added to the component (a) or the component (b) in advance before prepolymer synthesis. The inert organic solvent is used in prepolymer synthesis to result in a tendency to enable the reaction to uniformly progress.

Such other additive(s) is(are) used to easily cause the polycarbonate polyols to be increased in viscosity due to prepolymerization, and thus such other additive(s) is(are) preferably added to any (the component (a) or the component (b) to be added later) of the polycarbonate polyols, not prepolymerized.

When the one-shot method and the prepolymer method are compared, the prepolymer method more easily allows for adjustment of the molecular weight of a soft segment moiety to consequently lead to the occurrence of phase separation between a soft segment and a hard segment, resulting in a tendency to provide a polyurethane obtained which has excellent flexibility and low-temperature characteristics. Accordingly, the prepolymer method is preferable.

When the method for prepolymerizing the component (a) and the method for prepolymerizing the component (b) are compared with respect to the prepolymer method, the method for prepolymerizing the component (b) can more allow for a decrease in viscosity of a prepolymer obtained, resulting in a tendency to enable decreased amount of the inert organic solvent used. Accordingly, the method for prepolymerizing the component (b) is preferable.

<Method for Producing Synthetic Leather>

Synthetic leather can be produced from the curable composition of the present embodiment. Examples of the method for producing synthetic leather from the curable composition of the present embodiment include a wet method involving wet coagulation by coating or impregnating a base material (base fabric) with the curable composition of the present embodiment, and a dry method involving coating release paper or a base material (base fabric) with the curable composition of the present embodiment and drying the resultant.

The method for producing synthetic leather, here used, can also be a transfer coating method (one dry method) involving coating release paper with the curable composition of the present embodiment to form a skin material, then laminating thereon a base material (base fabric) with the curable composition of the present embodiment, used as an adhesion layer, and thereafter removing the release paper.

The dry method (transfer coating method) is suitably used because the amount of the inert organic solvent used in the curable composition of the present embodiment is decreased.

The method for producing synthetic leather is described below with a dry method as an example.

The base material (base fabric) here used can be any of various base materials, and examples thereof include a fibrous base material. Examples of the fibrous base material include a fiber aggregate obtained by forming a fiber into a non-woven fabric, a woven fabric, a net cloth or the like, or a fiber aggregate in which each fiber is bound by an elastic polymer. Examples of the fiber for use in the fiber aggregate include natural fibers such as cotton, linen and wool, recycled or semi-synthetic fibers such as rayon and acetate, and synthetic fibers such as polyamide, polyester, polyacrylonitrile, polyvinyl alcohol and polyolefin. Such a fiber may be a single spun fiber or a mixed spun fiber. Other examples of the base material include paper, release paper, a plastic film such as polyester or polyolefin, a plate of a metal such as aluminum, and a glass plate.

The curable composition of the present embodiment can be subjected to coating by a method generally used. Examples of a coating tool can include a floating knife coater, a knife-over-roll coater, a reverse roll coater, a roll doctor coater, a gravure roll coater and a kiss roll coater.

Synthetic leather obtained can be used as it is. Alternatively, synthetic leather is obtained in a mode where the synthetic leather is coated with a polymer solution or emulsion of a polyurethane resin, vinyl chloride, a cellulose resin or the like, in order that various properties are further imparted. Synthetic leather can also be obtained in a mode of a laminate obtained by laminating a coating film obtained by drying of the polymer solution or emulsion applied separately on release paper and then peeling the release paper.

Hereinafter, the present embodiment is described with reference to the drawings. The drawings and production conditions described below correspond to one mode of the present embodiment, and the present embodiment is not limited thereto.

FIG. 1 is a schematic cross-sectional view of a synthetic leather laminate produced by a dry method illustrated in FIG. 2. The structure of the laminate has a skin layer 2 on a base material (non-woven fabric) 4 with an adhesion layer 3 being interposed therebetween. Release paper 1 used in production, although is attached onto the outermost layer, is peeled in use.

FIG. 2 is a schematic diagram illustrating one method for producing a dry synthetic leather laminate sheet by use of the curable composition of the present embodiment. In the production method, first, a curable composition obtained by mixing each raw material of the curable composition of the present embodiment, adjusted at a predetermined temperature in advance, by a mixing head 5 is allowed to flow down onto the release paper 1 (to which a leather-like pattern is usually applied).

In a case where the one-shot method is applied, the component (a), the component (b) and the component (c), and, if necessary, the inert organic solvent, the chain extender and the additive(s) are separately continuously fed to, or two including the component (c) and raw materials (mixture obtained by mixing the component (a), the component (b), if necessary, the inert organic solvent, the chain extender and the additive(s)) other than such a component are continuously fed to the mixing head 5 for mixing, and the resulting mixture is allowed to flow down onto the release paper 1.

In a case where the prepolymer method is applied, the prepolymer composition, the polycarbonate polyol (component (a) or component (b)) not prepolymerized, if necessary, the inert organic solvent, the chain extender and the additive(s) are separately continuously fed to, or two including the prepolymer composition and raw materials (mixture of the polycarbonate polyol (component (a) or component (b)) not prepolymerized, if necessary, the inert organic solvent, the chain extender and the additive(s)) other than such a component are continuously fed to the mixing head 5 for mixing, and the resulting mixture is allowed to flow down onto the release paper 1.

The temperature of each of the components before mixing is usually adjusted to 20 to 80° C., preferably 30 to 70° C., more preferably 40 to 60° C. The temperature of the mixing head 5 is also usually adjusted to 20° C. to 80° C., preferably 30 to 70° C., more preferably 40 to 60° C. The temperature of each of the components before mixing and the temperature of the mixing head 5 are each 20° C. or more and thus raw materials used, in particular, the polycarbonate polyols tend to be decreased in viscosity and the flow rate tends to be stabilized. The temperature of each of the components before mixing and the temperature of the mixing head 5 are each 80° C. or less and thus the curing rate of the curable composition of the present embodiment tends to be properly controlled, the curable composition tends to be inhibited from being rapidly increased in viscosity, and synthetic leather having a uniform thickness tends to be obtained.

Thereafter, a sheet having a certain thickness is formed through a coating roll 8 and then allowed to pass through a drier 11 to perform curing, and drying of the inert organic solvent, thereby forming the skin layer 2 of the synthetic leather. The temperature of the drier is usually set to 60 to 150° C., preferably 70 to 130° C., more preferably 80 to 110° C. The drying time is usually, 2 minutes to 15 minutes, preferably 3 minutes to 10 minutes, more preferably 4 minutes to 7 minutes.

Next, the curable composition of the present embodiment is obtained by mixing each raw material of the curable composition of the present embodiment, adjusted at a predetermined temperature in advance, by a mixing head 6, and is allowed to flow down to thereby form the adhesion layer 3.

In a case where the one-shot method is applied in production of the adhesion layer, the component (a), the component (b) and the component (c), and, if necessary, the inert organic solvent, the chain extender and the additive(s) are separately continuously fed to, or two including the component (c) and raw materials (mixture obtained by mixing the component (a), the component (b), if necessary, the inert organic solvent, the chain extender and the additive(s)) other than such a component are continuously fed to the mixing head 6 for mixing, and the resulting mixture is allowed to flow down onto the skin layer.

In a case where the prepolymer method is applied in production of the adhesion layer, the prepolymer composition, the polycarbonate polyol (component (a) or component (b)) not prepolymerized, if necessary, the inert organic solvent, the chain extender and the additive(s) are separately continuously fed to, or two including the prepolymer composition and raw materials (mixture of the polycarbonate polyol (component (a) or component (b)) not prepolymerized, if necessary, the inert organic solvent, the chain extender and the additive(s)) other than such a component are continuously fed to the mixing head 6 for mixing, and the resulting mixture is allowed to flow down onto the skin layer.

The temperature of each of the components before mixing is usually adjusted to 20 to 60° C., preferably 30 to 50° C., more preferably 35 to 45° C. The temperature of the mixing head 6 is also usually adjusted to 20 to 60° C., preferably 30 to 50° C., more preferably 35 to 45° C. The temperature of each of the components before mixing and the temperature of the mixing head 6 are each 20° C. or more and thus raw materials used, in particular, the polycarbonate polyols tend to be decreased in viscosity and the flow rate tends to be stabilized. The temperature of each of the components before mixing and the temperature of the mixing head 6 are each 60° C. or less and thus the curing rate of the curable composition of the present embodiment tends to be properly controlled, the curable composition tends to be inhibited from being rapidly increased in viscosity, and synthetic leather having a uniform thickness tends to be obtained.

Thereafter, a sheet having a certain thickness is formed through the coating roll 8 and then allowed to pass through the drier 11 to perform curing, and drying of the inert organic solvent, thereby forming the adhesion layer 3 of the synthetic leather. Next, a base material 4 and the adhesion layer 3 are stacked and pressure bonded by a pressure bonding roll 9, and thereafter a sheet structure 7 is obtained and wound by a winding roll 10, to thereby obtain a desired synthetic leather laminate. The temperature of the drier 11 is usually set to 50 to 110° C., preferably 60 to 100° C., more preferably 70 to 90° C. The drying time is usually, 2 minutes to 15 minutes, preferably 3 minutes to 10 minutes, more preferably 4 minutes to 7 minutes.

While FIG. 2 illustrates a production example of synthetic leather including three layers of skin layer/adhesion layer/base material, a synthetic leather laminate including two layers of skin layer/base material, from which the adhesion layer is omitted, can also be produced by the same facilities. The adhesiveness of the skin layer and the base material is controlled by adjusting the curing state of the curable composition. Specifically, the synthetic leather laminate can be obtained by pressure bonding the curable composition of the present embodiment, which is in the state of being not completely cured, with the base material. Thus, the curing temperature of the drier 11 is set to 50 to 110° C., preferably 60 to 100° C., more preferably 70 to 90° C. The drying time is usually set to 2 minutes to 15 minutes, preferably 3 minutes to 10 minutes, more preferably 4 minutes to 7 minutes.

<Application>

Synthetic leather obtained by using the curable composition of the present embodiment can be used in, for example, an interior material for automobiles, such as a seat for automobiles, furniture such as sofa, a clothing material, shoes, a bag, and other chandlery products.

EXAMPLES

Example 1

Hereinafter, the present invention is further specifically described with reference to Examples and Comparative Examples, but the present invention is not limited to these Examples as long as it does not depart from the gist thereof. In the following Examples and Comparative Examples, methods for analyzing and evaluating physical properties and the like of each of the components are as follows.

[Analysis and Evaluation of Polycarbonate Polyol]
<Hydroxyl Value of Polycarbonate Polyol>

The hydroxyl value was measured according to JIS K1557-1.

<Compositional Ratio (Ratio of Copolymerization) of Polycarbonate Polyol>

A 100-mL eggplant flask was charged with 1 g of a polycarbonate polyol sample, 30 g of ethanol and 4 g of potassium hydroxide were placed thereinto, and the resultant was reacted at 100° C. for 1 hour. After a reaction liquid was cooled to room temperature, 2 to 3 droplets of phenolphthalein as an indicator were added thereto, and the liquid was neutralized by hydrochloric acid. After cooling in a refrigerator for 1 hour, a salt precipitated was removed by filtration and analyzed with gas chromatography (GC). In GC analysis, gas chromatography GC-14B (manufactured by Shimadzu Corporation in Japan) equipped with DB-WAX (manufactured by J&W in USA) as a column was used, diethylene glycol diethyl ester was used as an internal standard, a hydrogen flame ionization detector (FID) was used as a detector, and each of the components was quantitatively analyzed. The temperature rise profile of the column included retention at 60° C. for 5 minutes and then a temperature rise to 250° C. at 10° C./min.

The compositional ratio (ratio of copolymerization) of each polycarbonate polyol was determined from the molar ratio of each alcohol component detected, by the above analysis results.

<Average Number of Functional Groups of Polycarbonate Polyol>

The average number of functional groups of a polycarbonate polyol synthesized by using only a diol monomer as a raw material was 2. In a case where a polyfunctional monomer was included as a raw material, the average number of functional groups was determined as follows. The number average molecular weight (Mn) of each polycarbonate polyol was determined by gel permeation chromatography (GPC) analysis (see below, with respect to GPC apparatus and analysis conditions) with a calibration curve created from a standard polystyrene having a known molecular weight. The average number (n) of functional groups per molecule was determined from the hydroxyl value separately analyzed and the number average molecular weight (Mn) determined by GPC, according to expression (5).

$$\text{Average number of functional groups }(n)=[Mn]\times([OH \text{ value}]\times10^{-3}/56.1) \quad (5)$$

(GPC Apparatus and Analysis Conditions)

GPC apparatus: HLC-8320 manufactured by Tosoh Corporation
Columns: TSKgel G4000H×1
G3000H×1
G2000H×2
Eluent: tetrahydrofuran (THF)
Flow rate: 1.0 mL/min
Column temperature: 40° C.
RI detector: RI (apparatus HLC-8320 built-in)

<Measurement of Melt Viscosity>

After each polycarbonate polyol was heated to 50° C. in advance, the melt viscosity was measured at 50° C. with an E-type viscometer (TVE-22HT manufactured by Toki Sangyo Co., Ltd., cone: No. 6).

[Analysis and Evaluation of Prepolymer Composition]
<Measurement of Melt Viscosity>

After each prepolymer composition was heated to 50° C. in advance, the melt viscosity was measured at 50° C. with an E-type viscometer (TVE-22HT manufactured by Toki Sangyo Co., Ltd., cone: No. 6) under a nitrogen atmosphere.

<Measurement of Isocyanate Group Concentration>

After 10 mL of a mixed solution of di-n-butylamine/toluene (mass ratio: 25.85/865) was diluted with 10 mL of dimethylformamide (DMF), the diluted product was titrated by a 0.1 N propanol hydrochloride solution to measure the amount of propanol hydrochloride necessary for neutralization, and the amount was defined as a blank value. Thereafter, 2 g of a prepolymer liquid was extracted, 10 mL of a mixed solution of di-n-butylamine/toluene was added thereto and stirred at room temperature for 30 minutes, thereafter the resultant was diluted with 10 mL of DMF and the diluted product was titrated by a 0.1 N propanol hydrochloride solution to measure the amount of the propanol hydrochloride solution necessary for neutralization in the same manner as in the blank measurement, and the amount of the remaining amine was quantitatively determined. The isocyanate group concentration was determined from the volume of the propanol hydrochloride solution necessary for neutralization, according to the following expression (6).

$$\text{Isocyanate group concentration (\% by mass)}=(V1-V2)\times f\times 42\times 100/(W\times 1000) \quad (6)$$

V1: Amount (mL) of 0.1 N propanol hydrochloride solution necessary for blank measurement
V2: Amount (mL) of 0.1 N propanol hydrochloride solution necessary for relevant measurement
W: Sample (g) used in relevant measurement
f: Factor of propanol hydrochloride solution

[Analysis and Evaluation of Polyurethane Film]
<Production of Polyurethane Film>

Each of the components of the curable composition of the present invention, warmed to 40° C. in advance, was added to a 200-mL separable four-necked flask equipped with a stirring blade (with four paddles inclined at 45 degrees) under a nitrogen atmosphere so that the amount of the curing composition was 80 g, and was stirred at 40° C. for 5 minutes, and then the resultant was applied onto a polypropylene resin sheet (100 mm width, 1200 mm length, 1 mm thickness) in a size of 80 mm width, 100 mm length and 0.6 mm thickness by use of an applicator, and the resultant was dried on a hot plate at a surface temperature of 60° C. for 2 hours and subsequently in an oven at 100° C. for 12 hours. The resultant was further left to still stand under a constant-temperature and constant-humidity condition of 23° C. and 55% RH for 12 hours or more, to thereby obtain a polyurethane film. The polyurethane film obtained was subjected to evaluation of various physical properties.

<Flexibility of Polyurethane Film>

The flexibility of the polyurethane film was evaluated by five examiners, and evaluated as touch in touching of the polyurethane film with their hands. The evaluation was performed according to the following criteria.

A means flexibleness, the evaluation results of the five examiners being consistent.

B means slight rigidity, the evaluation results of the five examiners being consistent.

C means rigidity, the evaluation results of the five examiners being consistent.

<Appearance of Polyurethane Film>

The surface appearance of the polyurethane film produced as described above was visually rated according to the following criteria.

A means a smooth surface.

B means a few streaks observed on the surface in the movement direction of the applicator.

C means many streaks observed on the surface in the movement direction of the applicator.

<Measurement of Molecular Weight>

The polyurethane film was partially cut out to prepare an N,N-dimethylacetamide solution so that the polyurethane concentration was 0.1% by mass, and the number average molecular weight (Mn) and the weight average molecular weight (Mw) were measured in terms of standard polystyrene with a GPC apparatus [product name "HLC-8320" (columns: Tskgel Super HM-H×4) manufactured by Tosoh Corporation, a solution of 2.6 g of lithium bromide dissolved in 1 L of dimethylacetamide was used as an eluent].

<Evaluation of Oleic Acid Resistance>

A test piece of 3 cm×3 cm was cut out from the polyurethane film. The mass of the test piece was measured by a precision balance, and thereafter the test piece was loaded into a glass bottle having a volume of 250 mL, into which 50 mL of oleic acid was placed as a test solvent, and was left to still stand in a constant-temperature bath at 80° C. under a nitrogen atmosphere for 16 hours. After the test, the test piece was taken out and the front and back surfaces thereof were lightly wiped by a paper wiper, thereafter mass measurement was performed with a precision balance, and the rate of change in mass (rate of increase) from that before the test was calculated. A rate of change in mass, closer to 0%, means more favorable oleic acid resistance. Preferably, the rate of change in mass is 33% or less.

<Evaluation of Ethanol Resistance>

After a urethane film was produced by the same method as in <Evaluation of oleic acid resistance> described above, the urethane film was cut out to a test piece of 3 cm×3 cm. The mass of the test piece was measured by a precision balance, and thereafter the test piece was loaded into a glass petri dish having an inner diameter of 10 cm, into which 50 mL of ethanol was placed as a test solvent, and immersed therein at a room temperature of about 23° C. for 1 hour. After the test, the test piece was taken out and lightly wiped by a paper wiper, thereafter mass measurement was performed with a precision balance, and the rate of change in mass (rate of increase) from that before the test was calculated. A rate of change in mass, closer to 0%, means more favorable ethanol resistance. Preferably, the rate is 18% or less.

<Tensile Test at Room Temperature>

A polyurethane test piece was prepared as a strip of 10 mm width, 100 mm length and about 0.5 mm thickness, according to JIS K6301 (2010), a tensile test was performed at a distance between chucks of 20 mm, at a tensile speed of 100 mm/min and at a temperature of 23° C. (relative humidity 55%) with a tensile tester (product name "Tensilon, Model RTE-1210" manufactured by Orientec Co., Ltd.), and the stress at 100% elongation of the test piece, and the strength at break and the elongation at break were measured. Preferably, the stress at 100% elongation (modulus at 100%) was 3.6 MPa or less.

<Tensile Test at Low Temperature>

A polyurethane test piece was prepared as a strip of 10 mm width, 100 mm length and about 0.5 mm thickness, according to JIS K6301 (2010), and a film was placed at a distance between chucks of 20 mm in a tensile tester (product name "Tensilon, Model RTE-1210" manufactured by Orientec Co., Ltd.) equipped with a constant-temperature bath ("Model TLF-R3T-E-W" manufactured by Orientec Co., Ltd.). Subsequently, a tensile test was performed at a tensile speed of 100 mm/min after still standing at −20° C. for 5 minutes, and the stress at 100% elongation of the test piece was measured. Preferably, the stress at 100% elongation (modulus at 100%) was 18.0 MPa or less.

<Evaluation of Heat Resistance>

The polyurethane film was formed into a strip of 10 mm width, 100 mm length and about 50 μm thickness, and heated in a gear oven at a temperature of 120° C. for 1000 hours. The breaking strength of the sample after heating was measured in the same manner as <Tensile test at room temperature>, and the percentage (%) of retention was determined. Preferably, the percentage of retention of breaking strength was 90% or more.

<Evaluation of Hydrolysis Resistance>

The polyurethane film was formed into a strip of 10 mm width, 100 mm length and about 50 μm thickness, and heated in a constant-temperature and constant-humidity bath at a temperature of 70° C. and at a relative humidity of 95% for 400 hours. The breaking strength of the sample after heating was measured in the same manner as <Tensile test at room temperature>, and the percentage (%) of retention was determined. Preferably, the percentage of retention of breaking strength was 90% or more.

[Analysis and Evaluation of Synthetic Leather]

<Flexibility of Synthetic Leather>

The flexibility of synthetic leather was evaluated by five examiners, and evaluated as touch in touching of the synthetic leather with their hands. The evaluation was performed according to the following criteria.

A means flexibleness, the evaluation results of the five examiners being consistent.

B means slight rigidity, the evaluation results of the five examiners being consistent.

C means rigidity, the evaluation results of the five examiners being consistent.

<Wear Resistance of Synthetic Leather>

A load of 9.8 N was applied to a friction block covered with a cotton cloth, to wear the surface of synthetic leather. The friction block was reciprocated for wearing within 140 mm on the surface of synthetic leather at a rate of 60 times/min for 10000 times. The synthetic leather after wearing was observed and rated according to the following criteria.

A means no cleavage or breakage in a resin layer.

B means any cleavage generated in a resin layer.

C means any breakage generated in a resin layer.

<Low Temperature Storage Stability of Synthetic Leather>

Synthetic leather was wound on a paper tube having a diameter of 10 cm, and stored in a constant-temperature bath at a temperature of −20° C. for one month. The synthetic leather was removed from the paper tube, left to still stand in a constant-temperature room at a temperature 23° C. and at a humidity of 50% for one day, and the surface thereof was visually observed.

A case where there was no crack or wrinkle was rated as "A", a case where any fine crack and wrinkle each having a size of 1 mm or less were observed was rated as "B" and a case where any crack and any wrinkle each having a size of more than 1 mm were observed was rated as "C".

<Method for Evaluating Adhesiveness>

An incision was made on the interface between a polyester base fabric and a polyurethane resin layer of synthetic leather in advance, the urethane resin layer peeled and the base fabric were each secured by chucks, and the peel strength between the polyurethane layer and the base fabric was measured at a temperature of 23° C. and at a speed of 200 mm/min with a tensile tester (Tensilon, Model RTE-1210 manufactured by Orientec Co., Ltd. was used) according to JIS K6854-2, and evaluated as adhesiveness.

Polymerization Example 1 of Polycarbonate Polyol

A 2-L glass flask equipped with a rectifier filled with a regular packing and a stirring apparatus was loaded with 423 g (4.8 mol) of ethylene carbonate, 250 g (2.4 mol) of 1,5-pentanediol and 284 g (2.4 mol) of 1,6-hexanediol. Thereto was added of 0.09 g of titanium tetrabutoxide as a catalyst, a reaction was performed for 12 hours while the reaction temperature was 140 to 160° C. and the pressure was dropped from 10 kPa to 2 kPa, and a mixture of ethylene glycol and ethylene carbonate, produced, was distilled off.

Thereafter, switching to simple distillation was made, and a monomer was distilled out by a reaction at 180° C. for 5 hours while the pressure was gradually reduced to 0.5 kPa. The results of analysis of the polycarbonate diol obtained (also designated as PC1) were shown in Table 1.

Polymerization Example 2 of Polycarbonate Polyol

Using the same apparatus as that of Polymerization Example 1 described above, the same polymerization as in Polymerization Example 1 was performed except that 387 g (4.4 mol) of ethylene carbonate, 150 g (1.4 mol) of 1,5-pentanediol, 350 g (3.0 mol) of 1,6-hexanediol, and 0.09 g of titanium tetrabutoxide as a catalyst were loaded. The results of analysis of the polycarbonate polyol obtained (also designated as PC2) were shown in Table 1.

Polymerization Example 3 of Polycarbonate Polyol

Using the same apparatus as that of Polymerization Example 1 described above, the same polymerization as in Polymerization Example 1 was performed except that 387 g (4.4 mol) of ethylene carbonate, 312 g (3.0 mol) of 1,5-pentanediol, 165 g (1.4 mol) of 1,6-hexanediol, and 0.09 g of titanium tetrabutoxide as a catalyst were loaded. The results of analysis of the polycarbonate polyol obtained (also designated as PC3) were shown in Table 1.

Polymerization Example 4 of Polycarbonate Polyol

The same polymerization as in Polymerization Example 1 was performed except that the polymerization time after switching to simple distillation was 8 hours. The results of analysis of the polycarbonate polyol obtained (also designated as PC4) were shown in Table 1.

Polymerization Example 5 of Polycarbonate Polyol

The same polymerization as in Polymerization Example 1 was performed except that the polymerization time after switching to simple distillation was 4 hours. The results of analysis of the polycarbonate polyol obtained (also designated as PC5) were shown in Table 1.

Polymerization Example 6 of Polycarbonate Polyol

Using the same apparatus as that of Polymerization Example 1 described above, the same polymerization as in Polymerization Example 1 was performed except that 423 g (4.8 mol) of ethylene carbonate, 216 g (2.4 mol) of 1,4-butanediol, 284 g (2.4 mol) of 1,6-hexanediol, and 0.09 g of titanium tetrabutoxide as a catalyst were loaded. The results of analysis of the polycarbonate polyol obtained (also designated as PC6) were shown in Table 1.

Polymerization Example 7 of Polycarbonate Polyol

The same polymerization as in Polymerization Example 1 was performed except that the polymerization time after switching to simple distillation was 1 hours. The results of analysis of the polycarbonate polyol obtained (also designated as PC7) were shown in Table 1.

Polymerization Example 8 of Polycarbonate Polyol

The same polymerization as in Polymerization Example 1 was performed except that the polymerization time after switching to simple distillation was 1.5 hours. The results of analysis of the polycarbonate polyol obtained (also designated as PC8) were shown in Table 1.

Polymerization Example 9 of Polycarbonate Polyol

The same polymerization as in Polymerization Example 1 was performed except that the polymerization time after switching to simple distillation was 2 hours. The results of analysis of the polycarbonate polyol obtained (also designated as PC9) were shown in Table 1.

Polymerization Example 10 of Polycarbonate Polyol

The same polymerization as in Polymerization Example 6 was performed except that the polymerization time after switching to simple distillation was 1 hours. The results of analysis of the polycarbonate polyol obtained (also designated as PC10) were shown in Table 1.

Polymerization Example 11 of Polycarbonate Polyol

The same polymerization as in Polymerization Example 1 was performed except that 352 g (4.0 mol) of ethylene carbonate, 236 g (2.0 mol) of 1,6-hexanediol, 208 g (2.0 mol) of 1,5-pentanediol, 10.0 g (0.057 mol) of trimethylolpropane, and 0.09 g of titanium tetrabutoxide as a catalyst were loaded to a 2-L glass flask equipped with a rectifier filled with a regular packing and a stirring apparatus. The results of analysis of the polycarbonate polyol obtained (also designated as PC11) were shown in Table 1.

Polymerization Example 12 of Polycarbonate Polyol

The same polymerization as in Polymerization Example 11 was performed except that the polymerization time after switching to simple distillation was 1.5 hours. The results of analysis of the polycarbonate polyol obtained (also designated as PC12) were shown in Table 1.

Polymerization Example 13 of Polycarbonate Polyol

The same polymerization as in Polymerization Example 1 was performed except that 423 g (4.8 mol) of ethylene carbonate, 144 g (1.6 mol) of 1,4-butanediol, 167 g (1.6 mol) of 1,5-pentanediol, 189 g (1.6 mol) of 1,6-hexanediol, and 0.09 g of titanium tetrabutoxide as a catalyst were loaded to a 2-L glass flask equipped with a rectifier filled with a regular packing and a stirring apparatus. The results of analysis of the polycarbonate polyol obtained (also designated as PC13) were shown in Table 1.

Polymerization Example 14 of Polycarbonate Polyol

The same polymerization as in Polymerization Example 1 was performed except that 423 g (4.8 mol) of ethylene carbonate, 229 g (2.2 mol) of 1,5-pentanediol, 236 g (2.0 mol) of 1,6-hexanediol, 122 g (0.7 mol) of 1,10-decanediol, and 0.09 g of titanium tetrabutoxide as a catalyst were load to a 2-L glass flask equipped with a rectifier filled with a regular packing and a stirring apparatus. The results of analysis of the polycarbonate polyol obtained (also designated as PC14) were shown in Table 1.

Polymerization Example 15 of Polycarbonate Polyol

Using the same apparatus as that of Polymerization Example 1 described above, the same polymerization as in Polymerization Example 1 was performed except that 423 g (4.8 mol) of ethylene carbonate, 284 g (2.4 mol) of 3 methyl-1,5-pentanediol, 284 g (2.4 mol) of 1,6-hexanediol, and 0.09 g of titanium tetrabutoxide as a catalyst were loaded. The results of analysis of the polycarbonate polyol obtained (also designated as PC15) were shown in Table 1.

Polymerization Example 16 of Polycarbonate Polyol

The same polymerization as in Polymerization Example 1 was performed except that 423 g (4.8 mol) of ethylene carbonate, 567 g (4.8 mol) of 1,6-hexanediol, and 0.09 g of titanium tetrabutoxide as a catalyst were loaded to a 2-L glass flask equipped with a rectifier filled with a regular packing and a stirring apparatus. The results of analysis of the polycarbonate polyol obtained (also designated as PC16) were shown in Table 1.

Polymerization Example 17 of Polycarbonate Polyol

The same polymerization as in Polymerization Example 1 was performed except that the polymerization time after switching to simple distillation was 3 hours. The results of analysis of the polycarbonate polyol obtained (also designated as PC17) were shown in Table 1.

Polymerization Example 18 of Polycarbonate Polyol

The same polymerization as in Polymerization Example 1 was performed except that the polymerization time after switching to simple distillation was 10 hours. The results of analysis of the polycarbonate polyol obtained (also designated as PC18) were shown in Table 1.

Polymerization Example 19 of Polycarbonate Polyol

A 1-L glass flask equipped with a stirring apparatus was loaded with 300 g of polycarbonate polyol PC1 obtained in Polymerization Example 1 described above and 100 g of polyoxypropylene glycol ("Newpol PE-61" (trade name) manufactured by Sanyo Chemical Industries, number average molecular weight: about 2000), and the content thereof was heated with stirring and reacted at a reactor temperature of about 145° C. for 10 hours. The results of analysis of a polycarbonate polyol obtained (also designated as PC19) were shown in Table 1.

Polymerization Example 20 of Polycarbonate Polyol

A 1-L glass flask equipped with a stirring apparatus was loaded with 280 g of polycarbonate polyol PC6 obtained in Polymerization Example 6 described above and 120 g of polyoxypropylene glycol ("Newpol PE-61" (trade name) manufactured by Sanyo Chemical Industries, number average molecular weight: about 2000), and the content thereof was heated with stirring and reacted at a reactor temperature of about 145° C. for 10 hours. The results of analysis of a polycarbonate polyol obtained (also designated as PC20) were shown in Table 1.

TABLE 1

| | Ratio of copolymerization (mol %) | | | | | Hydroxyl value | Average number of functional | Melt viscosity at 50 C. | Polycarbonate polyol |
|---|---|---|---|---|---|---|---|---|---|
| | BDO | PDO | HDO | DDO | 3MPDO | (mgKOH/g) | groups | (mPa . S) | obtained |
| Polymerization Example 1 | 0 | 48 | 52 | 0 | 0 | 56.1 | 2.0 | 11500 | PC1 |
| Polymerization Example 2 | 0 | 31 | 69 | 0 | 0 | 56.3 | 2.0 | 11000 | PC2 |
| Polymerization Example 3 | 0 | 69 | 31 | 0 | 0 | 55.8 | 2.0 | 12100 | PC3 |
| Polymerization Example 4 | 0 | 47 | 53 | 0 | 0 | 42.3 | 2.0 | 19500 | PC4 |
| Polymerization Example 5 | 0 | 48 | 52 | 0 | 0 | 67.1 | 2.0 | 10500 | PC5 |
| Polymerization Example 6 | 48 | 0 | 52 | 0 | 0 | 56.3 | 2.0 | 11900 | PC6 |
| Polymerization Example 7 | 0 | 49 | 51 | 0 | 0 | 226 | 2.0 | 320 | PC7 |
| Polymerization Example 8 | 0 | 47 | 53 | 0 | 0 | 138 | 2.0 | 930 | PC8 |
| Polymerization Example 9 | 0 | 48 | 52 | 0 | 0 | 115 | 2.0 | 1820 | PC9 |
| Polymerization Example 10 | 47 | 0 | 53 | 0 | 0 | 230 | 2.0 | 380 | PC10 |
| Polymerization Example 11 | 0 | 47 | 53 | 0 | 0 | 66.8 | 2.4 | 11000 | PC11 |
| Polymerization Example 12 | 0 | 49 | 51 | 0 | 0 | 166 | 2.6 | 860 | PC12 |
| Polymerization Example 13 | 31 | 34 | 39 | 0 | 0 | 55.9 | 2.0 | 11800 | PC13 |
| Polymerization Example 14 | 0 | 44 | 41 | 15 | 0 | 55.5 | 2.0 | 8600 | PC14 |
| Polymerization Example 15 | 0 | 0 | 50 | 0 | 50 | 56.2 | 2.0 | 10800 | PC15 |
| Polymerization Example 16 | 0 | 0 | 100 | 0 | 0 | 56.2 | 2.0 | 11000 | PC16 |
| Polymerization Example 17 | 0 | 48 | 52 | 0 | 0 | 90.5 | 2.0 | 5400 | PC17 |
| Polymerization Example 18 | 0 | 48 | 52 | 0 | 0 | 38.1 | 2.0 | 33500 | PC18 |
| Polymerization Example 19 | 0 | 48 | 52 | 0 | 0 | 56.1 | 2.0 | 4800 | PC19 |
| Polymerization Example 20 | 48 | 0 | 52 | 0 | 0 | 56.3 | 2.0 | 3600 | PC20 |

BDO: 1,4-Butanediol
PDO: 1,5-Pentanediol
HDO: 1,6-Hexanediol
DDO: 1,10-Decanediol
3MPDO: 3-Methyl-1,5-pentanediol Synthesis Example 1 of Prepolymer A 500-mL separable flask sealed with nitrogen gas was loaded with 30 g (0.12 mol) of MDI, and warmed to 50° C. 120 g of methyl ethyl ketone (MEK) warmed to 50° C., and 120 g (0.06 mol) of polycarbonate polyol PC1 to which 0.007 g of dibutyltin dilaurate as a catalyst was added, were dropped under stirring over 30 minutes. The reaction was made at 50° C. under stirring for 2 hours, to obtain a prepolymer with both terminals being isocyanate. The results of analysis of the prepolymer obtained (also designated as PCP1) were shown in Table 2.

Synthesis Examples 2 to 18 of Prepolymer

Each prepolymer was synthesized in the same manner as in Synthesis Example 1 of prepolymer except that the respective amounts of the polycarbonate polyol, MDI and MEK used were as shown in Table 2. The results of analysis of the prepolymers obtained (also respectively designated as PCP2 to PCP18) were shown in Table 2.

TABLE 2

| Prepolymer Synthesis Example | Polycarbonate polyol used | Mass of polycarbonate polyol (g) | Mass of MDI (g) | Mass of MEK (g) | Melt viscosity at 50° C. (mPa · s) | Isocyanate group concentration (% by mass) | Prepolymer obtained |
|---|---|---|---|---|---|---|---|
| 1 | PC1 | 120 | 30 | 120 | 7800 | 3.19 | PCP1 |
| 2 | PC2 | 120 | 30 | 120 | 7300 | 3.22 | PCP2 |
| 3 | PC3 | 120 | 30 | 120 | 8400 | 3.17 | PCP3 |
| 4 | PC4 | 159 | 30 | 120 | 16000 | 2.53 | PCP4 |
| 5 | PC5 | 102 | 30 | 100 | 5500 | 3.52 | PCP5 |
| 6 | PC6 | 140 | 30 | 120 | 8100 | 3.20 | PCP6 |
| 7 | PC7 | 60 | 60 | 30 | 1500 | 8.07 | PCP7 |
| 8 | PC8 | 96 | 60 | 30 | 1600 | 6.08 | PCP8 |
| 9 | PC9 | 120 | 60 | 30 | 2000 | 5.44 | PCP9 |
| 10 | PC10 | 60 | 60 | 30 | 1550 | 8.01 | PCP10 |
| 11 | PC13 | 120 | 30 | 120 | 7900 | 3.15 | PCP11 |
| 12 | PC14 | 120 | 30 | 120 | 4600 | 3.30 | PCP12 |
| 13 | PC15 | 120 | 30 | 120 | 7200 | 3.25 | PCP13 |
| 14 | PC16 | 120 | 30 | 120 | 7100 | 3.14 | PCP14 |
| 15 | PC17 | 75 | 30 | 90 | 2200 | 4.63 | PCP15 |
| 16 | PC18 | 177 | 30 | 120 | 32000 | 2.25 | PCP16 |
| 17 | PC1 | 120 | 45 | 120 | 8200 | 4.38 | PCP17 |
| 18 | PC7 | 60 | 60 | 0 | 4300 | 8.07 | PCP18 |

Synthesis Example 19 of Prepolymer

A 500-mL separable flask sealed with nitrogen gas was loaded with 31.5 g (0.12 mol) of hydrogenated MDI, and warmed to 50° C. 120 g of methyl ethyl ketone (MEK) warmed to 50° C., and 120 g (0.06 mol) of polycarbonate polyol PC1 to which 0.028 g of dibutyltin dilaurate as a catalyst was added, were dropped under stirring over 30 minutes. The reaction was made at 50° C. under stirring for 2 hours, to obtain a prepolymer composition with both terminals being isocyanate. The results of analysis of the prepolymer obtained (also designated as PCP19) were shown in Table 3.

Synthesis Examples 20 to 35 of Prepolymer

Each prepolymer composition was synthesized in the same manner as in Synthesis Example 19 of prepolymer except that the respective amounts of the polycarbonate polyol, hydrogenated MDI and MEK used were as shown in Table 3. The results of analysis of the prepolymers obtained (also respectively designated as PCP20 to PCP35) were shown in Table 3.

TABLE 3

| Prepolymer Synthesis Example | Polycarbonate polyol used | Mass of polycarbonate polyol (g) | Mass of MDI (g) | Mass of MEK (g) | Melt viscosity at 50° C. (mPa · s) | Isocyanate group concentration (% by mass) | Prepolymer obtained |
|---|---|---|---|---|---|---|---|
| 19 | PC1 | 120 | 31.5 | 120 | 7500 | 3.25 | PCP19 |
| 20 | PC2 | 120 | 31.5 | 120 | 7100 | 3.23 | PCP20 |
| 21 | PC3 | 120 | 31.5 | 120 | 8200 | 3.21 | PCP21 |
| 22 | PC4 | 159 | 31.5 | 120 | 15500 | 2.55 | PCP22 |

TABLE 3-continued

| Pre-polymer Synthesis Example | Polycarbonate polyol used | Mass of polycarbonate polyol (g) | Mass of MDI (g) | Mass of MEK (g) | Melt viscosity at 50° C. (mPa · s) | Isocyanate group concentration (% by mass) | Prepolymer obtained |
|---|---|---|---|---|---|---|---|
| 23 | PC5  | 102 | 31.5 | 100 | 5400  | 3.62 | PCP23 |
| 24 | PC6  | 140 | 31.5 | 120 | 7600  | 3.14 | PCP24 |
| 25 | PC7  | 60  | 63   | 30  | 1300  | 7.95 | PCP25 |
| 26 | PC8  | 96  | 63   | 30  | 1550  | 6.15 | PCP26 |
| 27 | PC9  | 120 | 63   | 30  | 1950  | 5.62 | PCP27 |
| 28 | PC10 | 60  | 63   | 30  | 1550  | 7.75 | PCP28 |
| 29 | PC13 | 120 | 31.5 | 120 | 7600  | 3.26 | PCP29 |
| 30 | PC14 | 120 | 31.5 | 120 | 4300  | 3.12 | PCP30 |
| 31 | PC15 | 120 | 31.5 | 120 | 6900  | 3.20 | PCP31 |
| 32 | PC16 | 75  | 31.5 | 90  | 2100  | 4.78 | PCP32 |
| 33 | PC17 | 177 | 31.5 | 120 | 31500 | 2.26 | PCP33 |
| 34 | PC1  | 120 | 47   | 120 | 6750  | 4.52 | PCP34 |
| 35 | PC7  | 60  | 63   | 0   | 4150  | 8.15 | PCP35 |

Example 1

A 200-mL separable flask with a stirring blade, sealed with nitrogen, was loaded with 40 g of polycarbonate polyol PC1 warmed to 40° C. in advance, 10 g of polycarbonate polyol PC7, 10 g of MDI dissolved at 80° C. in advance, 15 g of methyl ethyl ketone (MEK), and 0.003 g of dibutyltin dilaurate as a catalyst. After stirring at 40° C. for 5 minutes, the resultant was applied onto a polypropylene resin sheet (100 mm width, 1200 mm length, 1 mm thickness) in a size of 80 mm width, 100 mmm length and 0.6 mm thickness by use of an applicator, and the resultant was dried on a hot plate at a surface temperature of 60° C. for 2 hours and subsequently in an oven at 100° C. for 12 hours. The resultant was further left to still stand under a constant-temperature and constant-humidity condition of 23° C. and 55% RH for 12 hours or more, to thereby obtain a polyurethane film. The polyurethane film obtained was subjected to evaluation of various physical properties. The evaluation results were shown in Table 4.

Examples 2 to 16

Each polyurethane film was obtained in the same manner as in Example 1 except that the type and the amount of the polycarbonate polyol were the type and the amount described in Table 4. The evaluation results of the polyurethane film obtained were shown in Table 4.

Comparative Examples 1 to 4

Each polyurethane film was obtained in the same manner as in Example 1 except that the type and the amount of the polycarbonate polyol were the type and the amount described in Table 4. The evaluation results of the polyurethane film obtained were shown in Table 4.

TABLE 4

|  | Example 1 | Example 2 | Example 3 | Example 4 | Example 5 | Example 6 | Example 7 | Example 8 |
|---|---|---|---|---|---|---|---|---|
| Polycarbonate polyol-1 | PC1 | PC2 | PC3 | PC4 | PC5 | PC6 | PC1 | PC1 |
| Mass of polycarbonate polyol-1 (g) | 40 | 40 | 40 | 53 | 35.5 | 40 | 40 | 40 |
| Polycarbonate polyol-2 | PC7 | PC7 | PC7 | PC7 | PC7 | PC10 | PC8 | PC9 |
| Mass of polycarbonate polyol-2 (g) | 10 | 10 | 10 | 10 | 10 | 10 | 16.3 | 19.4 |
| MDI (g) | 10 | 10 | 10 | 10 | 10 | 10 | 10 | 10 |
| MEK (g) | 15 | 15 | 15 | 18 | 13 | 15 | 16 | 17 |
| Dibutyltin dilaurate (g) | 0.003 | 0.003 | 0.003 | 0.003 | 0.003 | 0.003 | 0.003 | 0.003 |
| Proportion of MEK in composition (% by mass) | 20.0 | 20.0 | 20.0 | 19.8 | 19.0 | 20.0 | 19.4 | 19.7 |
| Number average molecular weight Mn of polyurethane | 89000 | 78000 | 78000 | 68000 | 94000 | 96000 | 89000 | 76000 |
| <Tensile properties> |  |  |  |  |  |  |  |  |
| Strength at break (MPa) | 8.5 | 8.0 | 9.5 | 8.2 | 10.2 | 10.6 | 8.8 | 8.5 |
| Elongation at break (%) | 840 | 860 | 750 | 1100 | 680 | 850 | 900 | 950 |
| Modulus at 100% (MPa) | 1.8 | 1.6 | 2.0 | 1.3 | 2.7 | 1.1 | 1.4 | 1.2 |
| <Tensile properties at low temperature (−20° C.)> |  |  |  |  |  |  |  |  |
| Strength at break (MPa) | 22.5 | 21.0 | 28.0 | 26.5 | 22.5 | 28.0 | 23.0 | 22.5 |
| Elongation at break (%) | 400 | 415 | 325 | 500 | 400 | 450 | 440 | 475 |
| Modulus at 100% (MPa) | 11.2 | 10.0 | 11.6 | 8.8 | 13.6 | 7.6 | 9.6 | 8.4 |
| Oleic acid resistance Rate of change in mass (%) | 22 | 25 | 19 | 29 | 20 | 18 | 29 | 29 |
| Ethanol resistance Rate of change in mass (%) | 13 | 12 | 15 | 13 | 11 | 10 | 15 | 13 |

TABLE 4-continued

| | | | | | | | | |
|---|---|---|---|---|---|---|---|---|
| Heat resistance Percentage of retention of breaking strength (%) | 95 | 98 | 96 | 95 | 93 | 97 | 96 | 95 |
| Hydrolysis resistance Percentage of retention of breaking strength (%) | 95 | 97 | 93 | 96 | 92 | 98 | 97 | 93 |
| Flexibility of polyurethane film | A | A | A | A | B | A | A | A |
| Appearance of polyurethane film | A | A | A | B | A | A | A | B |

| | | Example 9 | Example 10 | Example 11 | Example 12 | Example 13 | Example 14 |
|---|---|---|---|---|---|---|---|
| | Polycarbonate polyol-1 | PC1 | PC11 | PC13 | PC14 | PC15 | PC16 |
| | Mass of polycarbonate polyol-1 (g) | 40 | 33.7 | 40 | 40 | 40 | 40 |
| | Polycarbonate polyol-2 | PC10 | PC12 | PC7 | PC7 | PC7 | PC7 |
| | Mass of polycarbonate polyol-2 (g) | 10 | 13.4 | 10 | 10 | 10 | 10 |
| | MDI (g) | 10 | 10 | 10 | 10 | 10 | 10 |
| | MEK (g) | 15 | 14 | 15 | 15 | 15 | 15 |
| | Dibutyltin dilaurate (g) | 0.003 | 0.003 | 0.003 | 0.003 | 0.003 | 0.003 |
| | Proportion of MEK in composition (% by mass) | 20.0 | 19.7 | 20.0 | 20.0 | 20.0 | 20.0 |
| | Number average molecular weight Mn of polyurethane | 98000 | (Not dissolved in DMF) | 93000 | 65000 | 72000 | 98000 |
| <Tensile properties> | | | | | | | |
| | Strength at break (MPa) | 10.5 | 11.9 | 9.2 | 10.6 | 7.8 | 11.9 |
| | Elongation at break (%) | 840 | 750 | 850 | 1000 | 620 | 760 |
| | Modulus at 100% (MPa) | 1.4 | 2.9 | 2.2 | 1.2 | 3.0 | 3.1 |
| <Tensile properties at low temperature (−20° C.)> | | | | | | | |
| | Strength at break (MPa) | 31.0 | 29.0 | 26.5 | 28.0 | 20.5 | 24.0 |
| | Elongation at break (%) | 475 | 315 | 400 | 525 | 315 | 390 |
| | Modulus at 100% (MPa) | 8.0 | 14.0 | 12.0 | 8.0 | 14.4 | 15.6 |
| | Oleic acid resistance Rate of change in mass (%) | 22 | 22 | 22 | 33 | 30 | 31 |
| | Ethanol resistance Rate of change in mass (%) | 10 | 5 | 13 | 10 | 16 | 13 |
| | Heat resistance Percentage of retention of breaking strength (%) | 98 | 96 | 95 | 98 | 90 | 95 |
| | Hydrolysis resistance Percentage of retention of breaking strength (%) | 95 | 98 | 95 | 95 | 95 | 98 |
| | Flexibility of polyurethane film | A | B | A | A | B | B |
| | Appearance of polyurethane film | A | A | A | A | A | A |

| | | Example 15 | Example 16 | Comparative Example 1 | Comparative Example 2 | Comparative Example 3 | Comparative Example 4 |
|---|---|---|---|---|---|---|---|
| | Polycarbonate polyol-1 | PC1 | PC1 | PC1 | — | PC17 | PC18 |
| | Mass of polycarbonate polyol-1 (g) | 40 | 40 | 80 | — | 50 | 59 |
| | Polycarbonate polyol-2 | PC7 | PC7 | — | PC7 | — | PC7 |
| | Mass of polycarbonate polyol-2 (g) | 10 | 10 | — | 20 | — | 10 |
| | MDI (g) | 10 | 10 | 10 | 10 | 10 | 10 |
| | MEK (g) | 5 | 0 | 22 | 7.5 | 15 | 19 |
| | Dibutyltin dilaurate (g) | 0.003 | 0.003 | 0.003 | 0.003 | 0.003 | 0.003 |
| | Proportion of MEK in composition (% by mass) | 7.7 | 0.0 | 19.6 | 20.0 | 20.0 | 19.4 |
| | Number average molecular weight Mn of polyurethane | 96000 | 61000 | 63000 | 95000 | 88000 | 69000 |
| <Tensile properties> | | | | | | | |
| | Strength at break (MPa) | 8.6 | 7.6 | 6.2 | 10.5 | 9.6 | 6.3 |
| | Elongation at break (%) | 880 | 650 | 1300 | 450 | 520 | 530 |
| | Modulus at 100% (MPa) | 1.9 | 2.5 | 0.8 | 4.6 | 4.0 | 1.4 |
| <Tensile properties at low | | | | | | | |

TABLE 4-continued

| temperature (−20° C.)> | | | | | | |
|---|---|---|---|---|---|---|
| Strength at break (MPa) | 22.5 | 21.0 | 15.5 | 31.0 | 31.5 | 18.0 |
| Elongation at break (%) | 410 | 380 | 400 | 190 | 225 | 250 |
| Modulus at 100% (MPa) | 10.4 | 13.2 | 5.2 | 21.2 | 19.2 | 9.6 |
| Oleic acid resistance Rate of change in mass (%) | 22 | 30 | 40 | 18 | 23 | 33 |
| Ethanol resistance Rate of change in mass (%) | 13 | 18 | 25 | 28 | 26 | 26 |
| Heat resistance Percentage of retention of breaking strength (%) | 95 | 90 | 88 | 89 | 90 | 88 |
| Hydrolysis resistance Percentage of retention of breaking strength (%) | 96 | 90 | 86 | 88 | 91 | 85 |
| Flexibility of polyurethane film | A | A | A | C | C | A |
| Appearance of polyurethane film | A | B | C | A | A | C |

Example 17

A 200-mL separable flask with a stirring blade, sealed with nitrogen, was loaded with 40 g of polycarbonate polyol PC1 warmed to 40° C. in advance, 10 g of polycarbonate polyol PC7, 10.5 g of hydrogenated MDI, 15 g of methyl ethyl ketone (MEK), and 0.009 g of dibutyltin dilaurate as a catalyst. After stirring at 40° C. for 5 minutes, the resultant was applied onto a polypropylene resin sheet (100 mm width, 1200 mm length, 1 mm thickness) in a size of 80 mm width, 100 mmm length and 0.6 mm thickness by use of an applicator, and the resultant was dried on a hot plate at a surface temperature of 60° C. for 2 hours and subsequently in an oven at 110° C. for 12 hours. The resultant was further left to still stand under a constant-temperature and constant-humidity condition of 23° C. and 55% RH for 12 hours or more, to thereby obtain a polyurethane film. The polyurethane film obtained was subjected to evaluation of various physical properties. The evaluation results were shown in Table 5.

Examples 18 to 31

Each polyurethane film was obtained in the same manner as in Example 17 except that the type and the amount of the polycarbonate polyol were the type and the amount described in Table 5. The evaluation results of the polyurethane film obtained were shown in Table 5.

Comparative Examples 5 to 8

Each polyurethane film was obtained in the same manner as in Example 17 except that the type and the amount of the polycarbonate polyol were the type and the amount described in Table 5. The evaluation results of the polyurethane film obtained were shown in Table 5.

Example 32

A 200-mL separable flask with a stirring blade, sealed with nitrogen, was loaded with 40 g of polycarbonate polyol PC1 warmed to 40° C. in advance, 10 g of polycarbonate polyol PC7, 7.7 g of Duranate TKA-100 (manufactured by Asahi Kasei Corporation: hexamethylene diisocyanate-based isocyanurate-type curing agent, NCO content=21.8% by mass, isocyanate groups in one molecule: 3), 15 g of methyl ethyl ketone (MEK), and 0.009 g of dibutyltin dilaurate as a catalyst. After stirring at 40° C. for 5 minutes, the resultant was applied onto a polypropylene resin sheet (100 mm width, 1200 mm length, 1 mm thickness) in a size of 80 mm width, 100 mmm length and 0.6 mm thickness by use of an applicator, and the resultant was dried on a hot plate at a surface temperature of 60° C. for 2 hours and subsequently in an oven at 110° C. for 12 hours. The resultant was further left to still stand under a constant-temperature and constant-humidity condition of 23° C. and 55% RH for 12 hours or more, to thereby obtain a polyurethane film. The polyurethane film obtained was subjected to evaluation of various physical properties. The evaluation results were shown in Table 5.

TABLE 5

| | Example 17 | Example 18 | Example 19 | Example 20 | Example 21 | Example 22 | Example 23 | Example 24 | Example 25 | Example 26 |
|---|---|---|---|---|---|---|---|---|---|---|
| Polycarbonate polyol-1 | PC1 | PC2 | PC3 | PC4 | PC5 | PC6 | PC1 | PC1 | PC1 | PC11 |
| Mass of polycarbonate polyol-1 (g) | 40 | 40 | 40 | 53 | 35.5 | 40 | 40 | 40 | 40 | 33.7 |
| Polycarbonate polyol-2 | PC7 | PC7 | PC7 | PC7 | PC7 | PC10 | PC8 | PC9 | PC10 | PC12 |
| Mass of polycarbonate polyol-2 (g) | 10 | 10 | 10 | 10 | 10 | 10 | 16.3 | 19.4 | 10 | 13.4 |
| Hydrogenated MDI (g) | 10.5 | 10.5 | 10.5 | 10.5 | 10.5 | 10.5 | 10.5 | 10.5 | 10.5 | 10.5 |
| Duranate TKA-100 (g) | 0 | 0 | 0 | 0 | 0 | 0 | 0 | 0 | 0 | 0 |

TABLE 5-continued

| | | | | | | | | | | |
|---|---|---|---|---|---|---|---|---|---|---|
| MEK (g) | 15 | 15 | 15 | 18 | 13 | 15 | 16 | 17 | 15 | 14 |
| Dibutyltin dilaurate (g) | 0.003 | 0.003 | 0.003 | 0.003 | 0.003 | 0.003 | 0.003 | 0.003 | 0.003 | 0.003 |
| Proportion of MEK in composition (% by mass) | 19.9 | 19.9 | 19.9 | 19.7 | 18.8 | 19.9 | 19.3 | 19.6 | 19.9 | 19.6 |
| Number average molecular weight Mn of polyurethane | 78000 | 65000 | 66000 | 54000 | 82000 | 86000 | 77000 | 65000 | 85000 | (Not dissolved in DMF) |
| <Tensile properties> | | | | | | | | | | |
| Strength at break (MPa) | 11.1 | 7.8 | 12.1 | 10.8 | 12.9 | 14.3 | 11.2 | 10.8 | 13.7 | 13.8 |
| Elongation at break (%) | 816 | 824 | 760 | 1000 | 680 | 808 | 784 | 848 | 832 | 744 |
| Modulus at 100% (MPa) | 2.1 | 1.9 | 2.3 | 1.8 | 2.7 | 1.7 | 1.8 | 1.9 | 1.9 | 3.1 |
| <Tensile properties at low temperature (−20° C.)> | | | | | | | | | | |
| Strength at break (MPa) | 15.0 | 13.5 | 17.7 | 16.8 | 14.7 | 17.4 | 13.8 | 13.5 | 18.6 | 19.5 |
| Elongation at break (%) | 390 | 400 | 305 | 450 | 375 | 425 | 405 | 460 | 465 | 305 |
| Modulus at 100% (MPa) | 11.6 | 10.8 | 11.6 | 8.4 | 12.8 | 8.0 | 8.8 | 9.2 | 10.0 | 14.0 |
| Oleic acid resistance | | | | | | | | | | |
| Rate of change in mass (%) | 25 | 28 | 22 | 30 | 23 | 21 | 31 | 32 | 25 | 25 |
| Ethanol resistance | | | | | | | | | | |
| Rate of change in mass (%) | 11 | 12 | 14 | 11 | 10 | 10 | 13 | 12 | 11 | 8 |
| Heat resistance | | | | | | | | | | |
| Percentage of retention of breaking strength (%) | 98 | 97 | 95 | 96 | 98 | 97 | 96 | 96 | 98 | 95 |
| Hydrolysis resistance | | | | | | | | | | |
| Percentage of retention of breaking strength (%) | 96 | 97 | 94 | 96 | 96 | 95 | 97 | 94 | 95 | 98 |
| Flexibility of polyurethane film | A | A | A | A | B | A | A | A | A | B |
| Appearance of polyurethane film | A | A | A | B | A | A | A | B | A | A |

| | Example 27 | Example 28 | Example 29 | Example 30 | Example 31 | Example 32 | Comparative Example 5 | Comparative Example 6 | Comparative Example 7 | Comparative Example 8 |
|---|---|---|---|---|---|---|---|---|---|---|
| Polycarbonate polyol-1 | PC13 | PC14 | PC15 | PC1 | PC1 | PC1 | PC1 | — | PC17 | PC18 |
| Mass of polycarbonate polyol-1 (g) | 40 | 40 | 40 | 40 | 40 | 40 | 80 | — | 50 | 59 |
| Polycarbonate polyol-2 | PC7 | PC7 | PC7 | PC7 | PC7 | PC7 | — | PC7 | — | PC7 |
| Mass of polycarbonate polyol-2 (g) | 10 | 10 | 10 | 10 | 10 | 10 | — | 20 | — | 10 |
| Hydrogenated MDI (g) | 10.5 | 10.5 | 10.5 | 10.5 | 10.5 | 0 | 10 | 10 | 10 | 10 |
| Duranate TKA-100 (g) | 0 | 0 | 0 | 0 | 0 | 7.7 | 0 | 0 | 0 | 0 |
| MEK (g) | 15 | 15 | 15 | 5 | 0 | 14 | 22 | 7.5 | 15 | 19 |
| Dibutyltin dilaurate (g) | 0.003 | 0.003 | 0.003 | 0.003 | 0.003 | 0.003 | 0.003 | 0.003 | 0.003 | 0.003 |
| Proportion of MEK in composition (% by mass) | 19.9 | 19.9 | 19.9 | 7.6 | 0.0 | 19.5 | 19.6 | 20.0 | 20.0 | 19.4 |
| Number average molecular weight Mn of polyurethane | 84000 | 54000 | 86000 | 85000 | 51000 | (Not dissolved in DMF) | 52000 | 86000 | 88000 | 55000 |

TABLE 5-continued

| <Tensile properties> | | | | | | | | | | |
|---|---|---|---|---|---|---|---|---|---|---|
| Strength at break (MPa) | 12.0 | 12.5 | 12.1 | 10.3 | 9.4 | 14.2 | 6.2 | 12.1 | 10.1 | 6.4 |
| Elongation at break (%) | 832 | 880 | 760 | 840 | 648 | 760 | 1120 | 400 | 448 | 480 |
| Modulus at 100% (MPa) | 2.5 | 1.8 | 3.6 | 2.6 | 2.6 | 2.8 | 2.9 | 5.6 | 4.9 | 1.6 |
| <Tensile properties at low temperature (−20° C.)> | | | | | | | | | | |
| Strength at break (MPa) | 16.5 | 17.1 | 15.3 | 13.8 | 13.5 | 17.4 | 9.6 | 17.4 | 18.6 | 12.0 |
| Elongation at break (%) | 385 | 455 | 375 | 370 | 345 | 400 | 375 | 180 | 205 | 225 |
| Modulus at 100% (MPa) | 13.2 | 8.4 | 18.0 | 10.4 | 12.8 | 12.4 | 14.0 | 29.2 | 25.2 | 12.0 |
| Oleic acid resistance | | | | | | | | | | |
| Rate of change in mass (%) | 25 | 33 | 34 | 22 | 28 | 22 | 45 | 20 | 26 | 38 |
| Ethanol resistance | | | | | | | | | | |
| Rate of change in mass (%) | 14 | 11 | 13 | 12 | 16 | 8 | 26 | 28 | 21 | 22 |
| Heat resistance | | | | | | | | | | |
| Percentage of retention of breaking strength (%) | 96 | 98 | 94 | 95 | 95 | 98 | 89 | 89 | 87 | 89 |
| Hydrolysis resistance | | | | | | | | | | |
| Percentage of retention of breaking strength (%) | 94 | 93 | 95 | 96 | 92 | 98 | 88 | 85 | 90 | 88 |
| Flexibility of polyurethane film | A | A | B | A | A | A | A | C | C | A |
| Appearance of polyurethane film | A | A | A | A | B | A | C | A | A | C |

Example 33

A 200-mL separable flask with a stirring blade, sealed with nitrogen, was loaded with 80 g of prepolymer composition PCP1 and 10 g of polycarbonate polyol PC7 warmed to 50° C. in advance. After stirring at 50° C. for 5 minutes, the resultant was applied onto a polypropylene resin sheet (100 mm width, 1200 mm length, 1 mm thickness) in a size of 80 mm width, 100 mmm length and 0.6 mm thickness by use of an applicator, and the resultant was dried on a hot plate at a surface temperature of 60° C. for 2 hours and subsequently in an oven at 100° C. for 12 hours. The resultant was further left to still stand under a constant-temperature and constant-humidity condition of 23° C. and 55% RH for 12 hours or more, to thereby obtain a polyurethane film. The polyurethane film obtained was subjected to evaluation of various physical properties. The evaluation results were shown in Table 6.

Examples 34 to 50

Each polyurethane film was obtained in the same manner as in Example 33 except that the types and the amounts of the prepolymer composition and the polycarbonate polyol were the types and the amounts described in Table 6. The evaluation results of the polyurethane film obtained were shown in Table 6.

Comparative Examples 9 to 12

Each polyurethane film was obtained in the same manner as in Example 33 except that the types and the amounts of the prepolymer composition and the polycarbonate polyol were the types and the amounts described in Table 6. The evaluation results of the polyurethane film obtained were shown in Table 6.

Example 51

A 200-mL separable flask with a stirring blade, sealed with nitrogen, was loaded with 25 g of prepolymer composition PCP7 and 46 g of polycarbonate polyol 1 warmed to 50° C. in advance, and 34 g of commercially available polyester polyol (Polylite OD-X2420 manufactured by DIC Corporation; liquid at ordinary temperature, hydroxyl value 56 mgKOH/g) PEs1. After stirring at 50° C. for 5 minutes, the resultant was applied onto a polypropylene resin sheet (100 mm width, 1200 mm length, 1 mm thickness) in a size of 80 mm width, 100 mmm length and 0.6 mm thickness by use of an applicator, and the resultant was dried on a hot plate at a surface temperature of 60° C. for 2 hours and subsequently in an oven at 100° C. for 12 hours. The resultant was further left to still stand under a constant-temperature and constant-humidity condition of 23° C. and 55% RH for 12 hours or more, to thereby obtain a polyurethane film. The polyurethane film obtained was subjected to evaluation of various physical properties. The evaluation results were shown in Table 6.

TABLE 6

|  | Example 33 | Example 34 | Example 35 | Example 36 | Example 37 | Example 38 | Example 39 | Example 40 | Example 41 |
|---|---|---|---|---|---|---|---|---|---|
| Prepolymer | PCP1 | PCP2 | PCP3 | PCP4 | PCP5 | PCP6 | PCP7 | PCP8 | PCP9 |
| Mass of prepolymer (g) | 80 | 80 | 80 | 91.6 | 68.7 | 80 | 25 | 31 | 35 |
| Polycarbonate polyol | PC7 | PC7 | PC7 | PC7 | PC7 | PC10 | PC1 | PC1 | PC1 |
| Mass of polycarbonate polyol (g) | 10 | 10 | 10 | 10 | 10 | 10 | 80 | 80 | 80 |
| Proportion of MEK in curable composition (% by mass) | 40.0 | 40.0 | 40.0 | 35.4 | 38.2 | 37.5 | 7.7 | 7.0 | 6.7 |
| Number average molecular weight Mn of polyurethane | 123000 | 115000 | 138000 | 105000 | 142000 | 136000 | 159000 | 156000 | 139000 |
| <Tensile properties> | | | | | | | | | |
| Strength at break (MPa) | 11.4 | 9.7 | 10.7 | 9.7 | 11.9 | 13.8 | 13.1 | 12.6 | 11.5 |
| Elongation at break (%) | 1160 | 1130 | 1200 | 1450 | 1100 | 1230 | 1300 | 1350 | 1130 |
| Modulus at 100% (MPa) | 1.3 | 1.1 | 1.7 | 1.2 | 2.4 | 1.0 | 1.3 | 1.2 | 1.1 |
| <Tensile properties at low temperature (−20° C.)> | | | | | | | | | |
| Strength at break (MPa) | 17.7 | 14.4 | 18.0 | 17.7 | 16.8 | 22.8 | 18.0 | 16.5 | 15.0 |
| Elongation at break (%) | 595 | 616 | 532 | 686 | 581 | 644 | 616 | 672 | 525 |
| Modulus at 100% (MPa) | 7.5 | 6.3 | 7.5 | 6.0 | 9.3 | 5.1 | 6.6 | 5.7 | 5.7 |
| Oleic acid resistance Rate of change in mass (%) | 20 | 23 | 18 | 25 | 18 | 19 | 15 | 16 | 16 |
| Ethanol resistance Rate of change in mass (%) | 10 | 12 | 12 | 11 | 10 | 10 | 8 | 9 | 9 |
| Heat resistance Percentage of retention of breaking strength (%) | 98 | 98 | 94 | 98 | 94 | 97 | 95 | 94 | 98 |
| Hydrolysis resistance Percentage of retention of breaking strength (%) | 96 | 97 | 95 | 96 | 95 | 97 | 97 | 98 | 95 |
| Flexibility of polyurethane film | A | A | A | A | B | A | A | A | A |
| Appearance of polyurethane film | A | A | A | B | A | A | A | A | B |

|  | Example 42 | Example 43 | Example 44 | Example 45 | Example 46 | Example 47 | Example 48 |
|---|---|---|---|---|---|---|---|
| Prepolymer | PCP10 | PCP11 | PCP12 | PCP13 | PCP14 | PCP17 | PCP18 |
| Mass of prepolymer ()g) | 25 | 80 | 80 | 80 | 80 | 56 | 23 |
| Polycarbonate polyol | PC1 | PC7 | PC7 | PC7 | PC7 | PC7 | PC1 |
| Mass of polycarbonate polyol (g) | 80 | 10 | 10 | 10 | 10 | 80 | 64 |
| Proportion of MEK in curable composition (% by mass) | 7.7 | 40.0 | 40.0 | 40.0 | 40.0 | 38.1 | 0.0 |
| Number average molecular weight Mn of polyurethane | 163000 | 136000 | 143000 | 135000 | 132000 | 146000 | 98000 |
| <Tensile properties> | | | | | | | |
| Strength at break (MPa) | 15.0 | 11.5 | 10.6 | 9.4 | 9.2 | 12.2 | 11.4 |
| Elongation at break (%) | 1350 | 1150 | 1250 | 1050 | 950 | 1100 | 1250 |
| Modulus at 100% (MPa) | 1.2 | 1.6 | 1.1 | 2.6 | 2.8 | 1.8 | 1.4 |
| <Tensile properties at low temperature (−20° C.)> | | | | | | | |
| Strength at break (MPa) | 20.4 | 15.9 | 16.8 | 13.5 | 14.4 | 20.4 | 16.5 |
| Elongation at break (%) | 630 | 574 | 665 | 504 | 497 | 546 | 588 |
| Modulus at 100% (MPa) | 6.3 | 8.1 | 6.0 | 9.9 | 10.8 | 8.7 | 7.2 |
| Oleic acid resistance Rate of change in mass (%) | 14 | 22 | 26 | 27 | 19 | 22 | 28 |
| Ethanol resistance Rate of change in mass (%) | 7 | 12 | 10 | 10 | 12 | 11 | 15 |
| Heat resistance Percentage of retention of breaking strength (%) | 97 | 95 | 97 | 90 | 94 | 95 | 95 |
| Hydrolysis resistance Percentage of retention of breaking strength (%) | 94 | 95 | 96 | 96 | 97 | 96 | 90 |
| Flexibility of polyurethane film | A | A | A | B | B | A | A |
| Appearance of polyurethane film | A | A | A | A | A | A | B |

TABLE 6-continued

|  | Example 49 | Example 50 | Example 51 | Comparative Example 9 | Comparative Example 10 | Comparative Example 11 | Comparative Example 12 |
|---|---|---|---|---|---|---|---|
| Prepolymer | PCP7 | PCP1 | PCP7 | PCP15 | PCP1 | PCP16 | PCP7 |
| Mass of prepolymer (g) | 25 | 80 | 25 | 58 | 80 | 97 | 25 |
| Polycarbonate polyol | PC11 | PC12 | PC1/PEs1 | PC7 | PC17 | PC7 | PC18 |
| Mass of polycarbonate polyol (g) | 64 | 13.5 | 46/34 | 10 | 25 | 10 | 118 |
| Proportion of MEK in curable composition (% by mass) | 8.5 | 38.5 | 7.7 | 40.0 | 34.2 | 33.6 | 6.0 |
| Number average molecular weight Mn of polyurethane | (Not dissolved in DMF) | (Not dissolved in DMF) | 148000 | 113000 | 83000 | 73000 | 83000 |
| <Tensile properties> | | | | | | | |
| Strength at break (MPa) | 12.6 | 11.9 | 9.0 | 13.1 | 8.2 | 8.4 | 6.5 |
| Elongation at break (%) | 1100 | 1100 | 930 | 750 | 760 | 830 | 630 |
| Modulus at 100% (MPa) | 2.5 | 1.5 | 2.7 | 4.8 | 1.5 | 1.5 | 1.4 |
| <Tensile properties at low temperature (−20° C.)> | | | | | | | |
| Strength at break (MPa) | 22.5 | 19.5 | 15.0 | 18.6 | 12.3 | 16.5 | 10.8 |
| Elongation at break (%) | 490 | 567 | 546 | 385 | 273 | 315 | 294 |
| Modulus at 100% (MPa) | 9.0 | 8.4 | 6.0 | 10.2 | 7.5 | 6.9 | 7.8 |
| Oleic acid resistance Rate of change in mass (%) | 10 | 12 | 28 | 38 | 39 | 35 | 38 |
| Ethanol resistance Rate of change in mass (%) | 5 | 7 | 15 | 25 | 21 | 20 | 22 |
| Heat resistance Percentage of retention of breaking strength (%) | 98 | 99 | 95 | 90 | 89 | 86 | 84 |
| Hydrolysis resistance Percentage of retention of breaking strength (%) | 97 | 96 | 88 | 85 | 86 | 84 | 85 |
| Flexibility of polyurethane film | B | A | B | C | A | A | A |
| Appearance of polyurethane film | A | A | A | A | C | C | C |

Example 52

A 200-mL separable flask with a stirring blade, sealed with nitrogen, was loaded with 80.4 g of prepolymer composition PCP19 and 10 g of polycarbonate polyol PC7 warmed to 50° C. in advance. After stirring at 50° C. for 5 minutes, the resultant was applied onto a polypropylene resin sheet (100 mm width, 1200 mm length, 1 mm thickness) in a size of 80 mm width, 100 mmm length and 0.6 mm thickness by use of an applicator, and the resultant was dried on a hot plate at a surface temperature of 60° C. for 2 hours and subsequently in an oven at 100° C. for 12 hours. The resultant was further left to still stand under a constant-temperature and constant-humidity condition of 23° C. and 55% RH for 12 hours or more, to thereby obtain a polyurethane film. The polyurethane film obtained was subjected to evaluation of various physical properties. The evaluation results were shown in Table 7.

Examples 53 to 68

Each polyurethane film was obtained in the same manner as in Example 52 except that the types and the amounts of the prepolymer composition and the polycarbonate polyol were the types and the amounts described in Table 7. The evaluation results of the polyurethane film obtained were shown in Table 7.

Comparative Examples 17 to 20

Each polyurethane film was obtained in the same manner as in Example 52 except that the types and the amounts of the prepolymer composition and the polycarbonate polyol were the types and the amounts described in Table 7. The evaluation results of the polyurethane film obtained were shown in Table 7.

TABLE 7

|  | Example 52 | Example 53 | Example 54 | Example 55 | Example 56 | Example 57 | Example 58 | Example 59 | Example 60 | Example 61 | Example 62 |
|---|---|---|---|---|---|---|---|---|---|---|---|
| Prepolymer | PCP19 | PCP20 | PCP21 | PCP22 | PCP23 | PCP24 | PCP25 | PCP26 | PCP27 | PCP28 | PCP29 |
| Mass of prepolymer (g) | 80.4 | 80.4 | 80.4 | 91.9 | 69 | 80.4 | 25.5 | 31.6 | 35.7 | 25.5 | 804 |
| Polycarbonate polyol | PC7 | PC7 | PC7 | PC7 | PC7 | PC10 | PC1 | PC1 | PC1 | PC1 | PC7 |
| Mass of polycarbonate polyol (g) | 10 | 10 | 10 | 10 | 10 | 10 | 80 | 80 | 80 | 80 | 10 |

TABLE 7-continued

|  | | | | | | | | | | |
|---|---|---|---|---|---|---|---|---|---|---|
| Proportion of MEK in curable composition (% by mass) | 39.8 | 39.8 | 39.8 | 35.2 | 38.0 | 37.3 | 7.6 | 7.0 | 6.6 | 7.6 | 39.8 |
| Number average molecular weight Mn of polyurethane | 112000 | 106000 | 125000 | 98000 | 135000 | 121000 | 148000 | 143000 | 128000 | 147000 | 125000 |
| <Tensile properties> | | | | | | | | | | | |
| Strength at break (MPa) | 13.8 | 124 | 12.8 | 11.4 | 13.9 | 16.3 | 15.0 | 14.2 | 13.9 | 17.4 | 13.2 |
| Elongation at break (%) | 1160 | 1160 | 1030 | 1390 | 1010 | 1250 | 1350 | 1380 | 1130 | 1300 | 1100 |
| Modulus at 100%(MPa) | 1.5 | 1.4 | 1.8 | 1.2 | 2.5 | 1.0 | 1.4 | 1.2 | 0.9 | 1.5 | 1.7 |
| <Tensile properties at low temperature (−20° C.)> | 18.9 | 17.7 | 21.9 | 19.5 | 20.4 | 21.6 | 25.2 | 22.2 | 20.4 | 27.0 | 19.5 |
| Strength at break (MPa) | | | | | | | | | | | |
| Elongation at break (%) | 588 | 595 | 532 | 665 | 504 | 616 | 630 | 665 | 665 | 65 | 574 |
| Modulus at 100%(MPa) | 7.8 | 7.5 | 8.4 | 7.2 | 10.5 | 5.1 | 7.2 | 6.6 | 5.4 | 6.9 | 8.1 |
| Oleic acid resistance | | | | | | | | | | | |
| Rate of change in mass (%) | 18 | 22 | 16 | 22 | 16 | 17 | 13 | 15 | 13 | 12 | 20 |
| Ethanol resistance | | | | | | | | | | | |
| Rate of change in mass (%) | 8 | 10 | 9 | 8 | 10 | 9 | 7 | 8 | 7 | 6 | 10 |
| Heat resistance | | | | | | | | | | | |
| Percentage of retention of breaking strength (%) | 98 | 99 | 96 | 98 | 96 | 97 | 98 | 96 | 98 | 97 | 98 |
| Hydrolysis resistance | | | | | | | | | | | |
| Percentage of retention of breaking strength (%) | 98 | 97 | 96 | 96 | 96 | 97 | 98 | 98 | 96 | 99 | 96 |
| Flexibility of polyurethane film | A | A | A | A | B | A | A | A | A | A | A |
| Appearance of polyurethane film | A | A | A | B | A | A | A | A | B | A | A |

|  | Example 63 | Example 64 | Example 65 | Example 66 | Example 67 | Example 68 | Comparative Example 17 | Comparative Example 18 | Comparative Example 19 | Comparative Example 20 |
|---|---|---|---|---|---|---|---|---|---|---|
| Prepolymer | PCP30 | PCP31 | PCP34 | PCP35 | PCP25 | PCP19 | PCP32 | PCP19 | PCP33 | PCP25 |
| Mass of prepolymer (g) | 80.4 | 80.4 | 56.3 | 23.5 | 25.5 | 80.4 | 58.3 | 80.4 | 97.5 | 25.5 |
| Polycarbonate polyol | PC7 | PC7 | PC7 | PC7 | PC11 | PC12 | PC7 | PC17 | PC7 | PC18 |
| Mass of polycarbonate polyol (g) | 10 | 10 | 10 | 80 | 64 | 13.5 | 10 | 25 | 10 | 118 |
| Proportion of MEK in curable composition (% by mass) | 39.8 | 39.8 | 37.9 | 0.0 | 8.5 | 38.5 | 39.7 | 33.7 | 33.5 | 5.9 |
| Number average molecular weight Mn of polyurethane | 132000 | 121000 | 131000 | 88000 | (Not dissolved in DMF) | (Not dissolved in DMF) | 95000 | 72000 | 64000 | 63000 |
| <Tensile properties> | | | | | | | | | | |
| Strength at break (MPa) | 14.4 | 15.0 | 16.2 | 15.0 | 15.0 | 12.5 | 13.2 | 8.6 | 10.0 | 7.6 |
| Elongation at break (%) | 1280 | 950 | 980 | 1230 | 1010 | 1080 | 730 | 730 | 750 | 602 |
| Modulus at 100%(MPa) | 1.2 | 2.9 | 2.5 | 1.6 | 2.6 | 2.4 | 5.3 | 1.5 | 1.3 | 1.2 |
| <Tensile properties at low temperature (−20° C.)> | 23.4 | 15.0 | 23.7 | 24.6 | 24.0 | 20.4 | 20.4 | 14.4 | 16.2 | 13.8 |
| Strength at break (MPa) | | | | | | | | | | |
| Elongation at break (%) | 651 | 476 | 532 | 616 | 476 | 546 | 350 | 392 | 301 | 294 |
| Modulus at 100%(MPa) | 5.4 | 11.4 | 9.3 | 7.5 | 9.6 | 8.7 | 26.7 | 7.8 | 7.2 | 6.6 |
| Oleic acid resistance | | | | | | | | | | |
| Rate of change in mass (%) | 23 | 16 | 19 | 26 | 8 | 10 | 38 | 35 | 30 | 32 |
| Ethanol resistance | | | | | | | | | | |
| Rate of change in mass (%) | 8 | 10 | 8 | 13 | 4 | 5 | 25 | 21 | 18 | 16 |
| Heat resistance | | | | | | | | | | |
| Percentage of retention of breaking strength (%) | 97 | 96 | 95 | 96 | 98 | 99 | 90 | 88 | 86 | 83 |

TABLE 7-continued

| Hydrolysis resistance | | | | | | | | | | |
|---|---|---|---|---|---|---|---|---|---|---|
| Percentage of retention of breaking strength (%) | 96 | 98 | 96 | 95 | 97 | 96 | 88 | 89 | 85 | 88 |
| Flexibility of polyurethane film | A | B | B | A | B | B | C | A | A | A |
| Appearance of polyurethane film | A | A | A | B | A | A | A | C | C | C |

Example 69

The same apparatus as the apparatus illustrated in FIG. 2 was used, release paper (manufactured by LINTEC Corporation, R-8) having an embossed pattern was used, and a composition having the same compositional ratio as in Example 17 was continuously mixed by a mixing head at a temperature of 40° C., allowed to continuously flow down on the release paper, and adjusted by a coating roll so that the thickness was 50 μm. The resultant was allowed to pass through a drier at 120° C., to form a urethane layer serving as a skin layer.

Next, a composition having the same compositional ratio as in Example 1 was continuously mixed by a mixing head at a temperature of 40° C., allowed to continuously flow down on the release paper, and adjusted by a coating roll so that the thickness was 250 μm. The resultant was allowed to pass through a drier at 120° C., to form a urethane layer serving as an adhesion layer.

Next, synthetic leather including a polyurethane laminate was obtained by laminating a base fabric (non-woven fabric including a polyester fiber) having a thickness of 500 μm by a pressure bonding roll, and winding the resultant by a winding roll. The synthetic leather obtained was evaluated and the results were shown in Table 8.

Examples 70 to 74

Each synthetic leather including a polyurethane laminate was obtained in the same manner as in Example 69 except that the type of the curable composition serving as a skin layer and the type of the curable composition serving as an adhesion layer were those of compositions shown in Table 8. The synthetic leather obtained was evaluated and the results were shown in Table 8.

Comparative Examples 21 to 24

Each synthetic leather including a polyurethane laminate was obtained in the same manner as in Example 69 except that the type of the curable composition serving as a skin layer and the type of the curable composition serving as an adhesion layer were those of compositions shown in Table 8. The synthetic leather obtained was evaluated and the results were shown in Table 8.

TABLE 8

| | Synthetic leather | | | | | | | | | |
|---|---|---|---|---|---|---|---|---|---|---|
| | Example 69 | Example 70 | Example 71 | Example 72 | Example 73 | Example 74 | Comparative Example 21 | Comparative Example 22 | Comparative Example 23 | Comparative Example 24 |
| | Compositional ratio of curable composition for skin layer | | | | | | | | | |
| | Example 17 | Example 22 | Example 52 | Example 57 | Example 64 | Example 57 | Comparative Example 5 | Comparative Example 7 | Comparative Example 17 | Comparative Example 19 |
| | Compositional ratio of curable composition for adhesion layer | | | | | | | | | |
| | Example 1 | Example 6 | Example 33 | Example 38 | Example 46 | Example 51 | Comparative Example 1 | Comparative Example 3 | Comparative Example 9 | Comparative Example 11 |
| Flexibility of synthetic leather | A | A | A | A | B | A | A | C | C | A |
| Wear resistance | A | A | A | A | B | A | C | A | A | C |
| Low temperature storage stability | A | A | A | A | A | A | B | C | C | B |
| Peel strength between polyurethane layer and base fabric (N/25 mm) | 0.9 | 0.8 | 0.9 | 1.1 | 0.7 | 1.6 | 0.5 | 0.4 | 0.4 | 0.5 |

Example 2-1

A 200-mL separable flask with a stirring blade, sealed with nitrogen, was loaded with 20 g of polycarbonate polyol PC1, 10 g of polycarbonate polyol PC7 and 20 g of polyester polyol PEs1, warmed to 40° C. in advance. After 10 g of MDI dissolved at 80° C. in advance was added and stirred at 40° C. for 5 minutes, the resultant was applied onto a glass plate (100 mm width, 1500 mm length, 1 mm thickness) in a size of 80 mm width, 100 mm length and 0.6 mm thickness by use of an applicator, and the resultant was dried in an oven at 100° C. for 12 hours. The resultant was further left to still stand under a constant-temperature and constant-humidity condition of 23° C. and 55% RH for 12 hours or more, to thereby obtain a polyurethane film. The polyurethane film obtained was subjected to evaluation of various physical properties. The evaluation results were shown in Table 9.

Examples 2-2 to 2-7

Each polyurethane film was obtained in the same manner as in Example 2-1 except that the type and the amount of the polycarbonate polyol was the type and amount described in solution of a pyrophosphoric acid solid (trade name "Phosphoric acid (105%)" manufactured by Taihei Chemical Industrial Co., Ltd.) was added when the rise of refractive index of a reaction liquid was 0.0055, and the reaction was then terminated. Next, unreacted HDI was removed by the same method as in Synthesis Example 1, to obtain polyisocyanate A-1. Polyisocyanate A-1 obtained had an NCO content rate of 17.4% and an average number of functional groups of 2.

TABLE 9

|  | Example 2-1 | Example 2-2 | Example 2-3 | Example 2-4 | Example 2-5 | Example 2-6 | Example 2-7 |
| --- | --- | --- | --- | --- | --- | --- | --- |
| Polycarbonate polyol-1 | PC1 | PC1 | PC1 | PC1 | PC1 | PC19 | PC20 |
| Mass of polycarbonate polyol-1 (g) | 20 | 20 | 20 | 20 | 20 | 40 | 40 |
| Polycarbonate polyol-2 | PC7 | PC7 | PC7 | PC7 | PC7 | PC7 | PC7 |
| Mass of polycarbonate polyol-2 (g) | 10 | 10 | 10 | 10 | 10 | 10 | 10 |
| Polyester polyol PEs 1 | 20 | 20 | 20 | 0 | 0 | 0 | 0 |
| MDI (g) | 10 | 0 | 0 | 0 | 0 | 10 | 10 |
| Duranate D101 (g) | 0 | 17.6 | 0 | 17.6 | 0 | 0 | 0 |
| PolyisocyanateA-1 (g) | 0 | 0 | 20.3 | 0 | 20.3 | 0 | 0 |
| Dibutyltin dilaurate (g) | 0 | 0 | 0.07 | 0 | 0.07 | 0 | 0 |
| Number average molecular weight Mn of polyurethane | 61000 | (Not dissolved in DMF) | (Not dissolved in DMF) | (Not dissolved in DMF) | (Not dissolved in DMF) | 61000 | 61000 |
| <Tensile properties> |  |  |  |  |  |  |  |
| Strength at break (MPa) | 5.0 | 3.5 | 7.7 | 7.6 | 9.6 | 5.5 | 4.6 |
| Elongation at break (%) | 700 | 660 | 2900 | 650 | 1100 | 1280 | 1400 |
| Modulus at 100% (MPa) | 1.9 | 1.3 | 0.8 | 2.5 | 1.5 | 1.8 | 1.3 |
| <Tensile properties at low temperature (−20° C.)> |  |  |  |  |  |  |  |
| Strength at break (MPa) | 15.2 | 14.7 | 11.0 | 21.0 | 15.1 | 12.8 | 14.2 |
| Elongation at break (%) | 450 | 490 | 600 | 350 | 500 | 490 | 500 |
| Modulus at 100% (MPa) | 3.8 | 2.1 | 1.3 | 12.2 | 5.1 | 2.5 | 2.3 |
| Oleic acid resistance Rate of change in mass (%) | 29 | 24 | 25 | 22 | 23 | 26 | 28 |
| Ethanol resistance Rate of change in mass (%) | 20 | 14 | 14 | 11 | 12 | 18 | 16 |
| Heat resistance Percentage of retention of breaking strength (%) | 90 | 94 | 95 | 95 | 95 | 87 | 88 |
| Hydrolysis resistance Percentage of retention of breaking strength (%) | 88 | 88 | 87 | 93 | 93 | 90 | 91 |
| Flexibility of polyurethane film | A | A | A | A | A | A | A |
| Appearance of polyurethane film | A | A | A | A | A | A | A |

Table 9. The evaluation results of the polyurethane film obtained were shown in Table 9. Duranate D101 (manufactured by Asahi Kasei Corporation: bifunctional isocyanate curing agent, NCO content=19.7% by mass, isocyanate groups in one molecule: 2) was used in each of Examples 2-2 and 2-4, and polyisocyanate A-1 described below was used in each of Examples 2-3 and 2-5.

[Synthesis Example 2-1] Synthesis of Polyisocyanate A-1

A four-necked flask equipped with a stirrer, a thermometer, a reflex cooling tube, a nitrogen blowing tube and a dropping funnel was in a nitrogen atmosphere and loaded with 1000 g of HDI and 78 g of 2-ethylhexanol, and a urethanation reaction was performed under stirring at 130° C. for 1 hour. Thereto was added 0.35 g of a 20% mineral sprit solution of zirconyl 2-ethylhexanoate as an alophanation catalyst. After 60 minutes, 0.47 g of a 39% ethanol

INDUSTRIAL APPLICABILITY

The curable composition of the present invention can be used in environment-responsive synthetic leather having excellent balance of physical properties including flexibility, chemical resistance, low-temperature characteristics, heat resistance and texture, and also allowing a small amount of solvent used.

The disclosure of Japanese Patent Application No. 2019-161308 filed on Sep. 4, 2019 is herein incorporated by reference in its entirety.

All documents, patent applications and technical standards described herein are herein incorporated by reference, as if each individual document, patent application and technical standard were specifically and individually indicated to be incorporated by reference.

REFERENCE SIGNS LIST 1 release paper
2 skin layer 3 adhesion layer
4 base material (non-woven fabric)
5 mixing head (skin layer)
6 mixing head (adhesion layer)
7 sheet structure (dry synthetic leather product)
8 coating roll
9 pressure bonding roll
10 winding roll
11 drier

The invention claimed is:

1. A curable composition comprising:
   a component (a): a polycarbonate polyol having a hydroxyl value of 50 to 75 mgKOH/g;
   a component (b): an aliphatic polycarbonate polyol having a hydroxyl value of 138 to 280 mgKOH/g; and
   a component (c): a polyisocyanate having an average number of functional groups per molecule, of 2 to 6.

2. The curable composition according to claim 1, wherein the polycarbonate polyol of the component (a) and the component (b) each has a repeating unit represented by the following formula (1) and a terminal hydroxyl group:

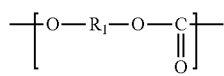
(1)

wherein $R_1$ is a divalent aliphatic or alicyclic hydrocarbon having 2 to 15 carbon atoms, where the $R_1$ for the component (a) and the component (b) may be the same or different, wherein $R_1$ for component (b) is aliphatic.

3. The curable composition according to claim 1, wherein the polycarbonate polyol of the component (a) and the component (b) each comprises a structure represented by the following formula (A):

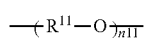
(A)

wherein each $R^{11}$ is a divalent linear, branched or cyclic aliphatic hydrocarbon group having 2 or more and 20 or less carbon atoms, or an aromatic hydrocarbon group for component (a), a plurality of $R^{11}$(s) may be the same as or different from each other, and n11 is an integer of 1 or more;

where the $R^{11}$ and the n11 for the component (a) and the component (b) may be the same or different.

4. The curable composition according to claim 2, wherein 50% by mol or more of the repeating unit represented by the formula (1) of the component (a) and the component (b) each comprises at least two repeating units selected from the following formula (2), formula (3), and formula (4),

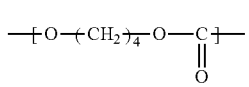
(2)

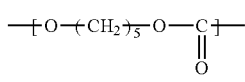
(3)

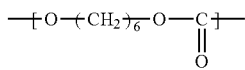
(4)

where the at least two repeating units for the component (a) and the component (b) may be the same or different.

5. The curable composition according to claim 1, comprising 40% by mass or less of an inert organic solvent based on a total amount of the curable composition.

6. The curable composition according to claim 1, comprising 50% by mass or less of a polyester polyol based on a total amount of the curable composition.

7. Synthetic leather produced from the curable composition according to claim 1.

* * * * *